US012593091B1

(12) United States Patent
Kaminsky et al.

(10) Patent No.: US 12,593,091 B1
(45) Date of Patent: Mar. 31, 2026

(54) CONTENT DELIVERY AND DATA EXCHANGE FOR IN-VEHICLE DEVICE IN VEHICULAR ENVIRONMENT USING STORAGE NETWORK

(71) Applicant: Adeia Guides Inc., San Jose, CA (US)

(72) Inventors: Evgeny Kaminsky, Hollywood, FL (US); Reda Harb, Saint Petersburg, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/900,519

(22) Filed: Sep. 27, 2024

(51) Int. Cl.
    *H04N 21/414*    (2011.01)
    *H04N 21/234*    (2011.01)
    *H04N 21/2387*   (2011.01)
(52) U.S. Cl.
    CPC . *H04N 21/41422* (2013.01); *H04N 21/23406* (2013.01); *H04N 21/2387* (2013.01)
(58) Field of Classification Search
    CPC ....... H04N 21/41422; H04N 21/23406; H04N 21/2387
    See application file for complete search history.

(56) References Cited

U.S. PATENT DOCUMENTS

| | | | | |
|---|---|---|---|---|
| 11,240,173 | B2 * | 2/2022 | Larabi | .................. H04L 67/562 |
| 2022/0368730 | A1 * | 11/2022 | Miao | ..................... H04W 76/10 |
| 2023/0275944 | A1 * | 8/2023 | Slater | .................. H04L 67/563 |
| | | | | 709/231 |

FOREIGN PATENT DOCUMENTS

WO    2016/123497 A1    8/2016

OTHER PUBLICATIONS

Akpolat, C., "Changing Face of Cities through Smart Poles & Edge Computing," available online at https://akpolatcem.medium.com/changing-face-of-cities-through-smart-poles-edge-computing-6692b562341b, Jan. 24, 2022, 22 pages.
Fang. S., et al., "A Cooperative RSU Caching Policy for Vehicular Content Delivery Networks in Two-Way Road with a T-junction," 2020 IEEE 91st Vehicular Technology Conference (VTC2020-Spring), 2020, pp. 1-5.

* cited by examiner

*Primary Examiner* — Mulugeta Mengesha
(74) *Attorney, Agent, or Firm* — HG LAW LLP

(57)    ABSTRACT

Content delivery and data exchange in a vehicle using a storage device network (SDN) with multiple nodes and a content delivery network (CDN) are provided. An in-vehicle device streams content from the CDN via the SDN. The in-vehicle device accesses the vehicle's location, accesses content availability information, and accesses an optimal SDN node for content delivery. Content requests are received and transmitted to the CDN, and content segments are received from the SDN. For video-on-demand (VOD), geo-location and route data are transmitted to a cloud service, which processes and delivers content from the CDN to the SDN. For live content, streaming is switched from the CDN to the optimal SDN node. Additional features include trick-play options, content uploads, and various transfer protocols. Related systems, devices, non-transitory, computer-readable media, and the like are also provided.

20 Claims, 13 Drawing Sheets

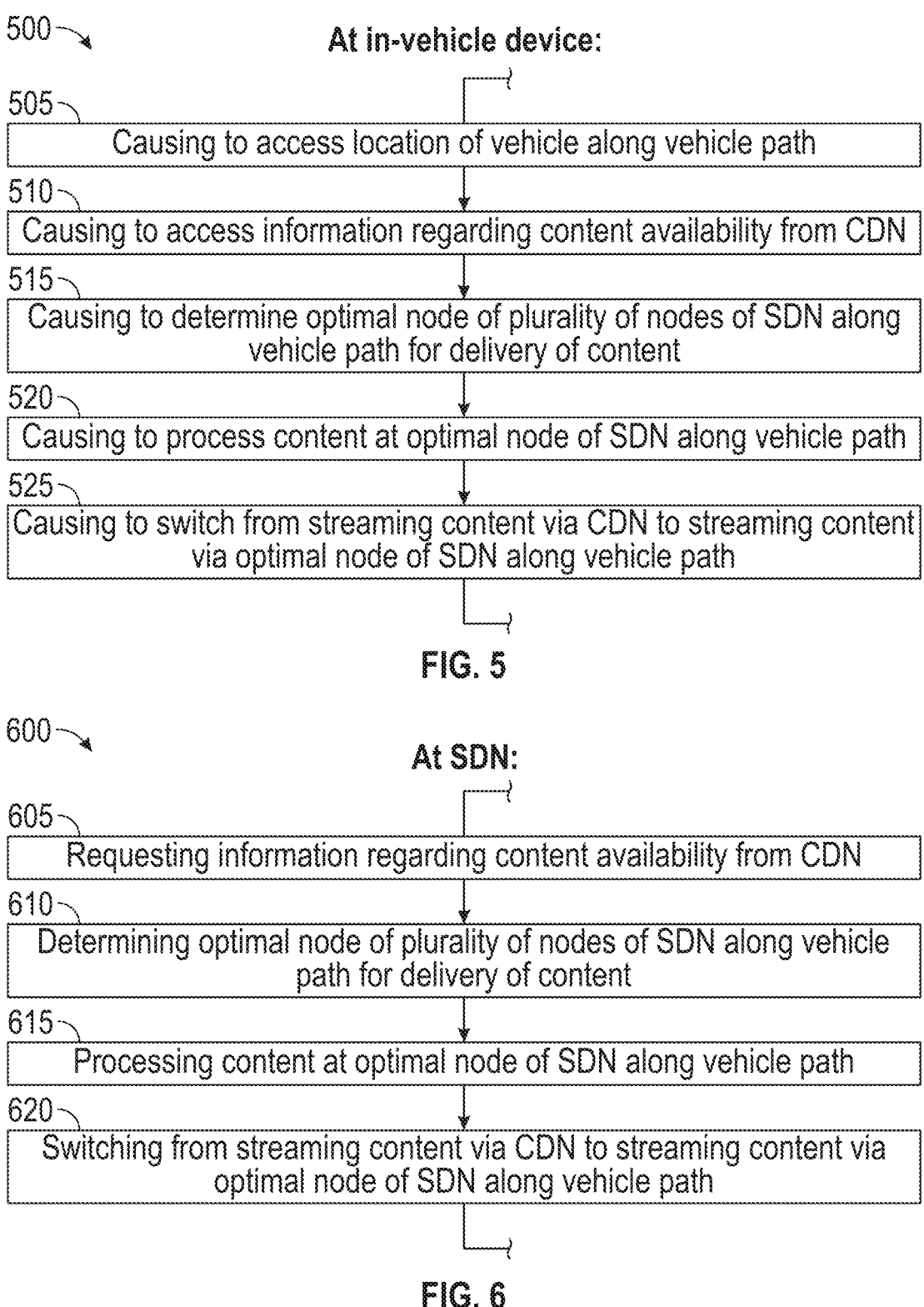

500 ⬎

At in-vehicle device:

505 ⬎
Causing to access location of vehicle along vehicle path

510 ⬎
Causing to access information regarding content availability from CDN

515 ⬎
Causing to determine optimal node of plurality of nodes of SDN along vehicle path for delivery of content 520 ⬎
Causing to process content at optimal node of SDN along vehicle path 525 ⬎
Causing to switch from streaming content via CDN to streaming content via optimal node of SDN along vehicle path

At SDN:

605 ⬎
Requesting information regarding content availability from CDN

610 ⬎
Determining optimal node of plurality of nodes of SDN along vehicle path for delivery of content 615 ⬎
Processing content at optimal node of SDN along vehicle path 620 ⬎
Switching from streaming content via CDN to streaming content via optimal node of SDN along vehicle path

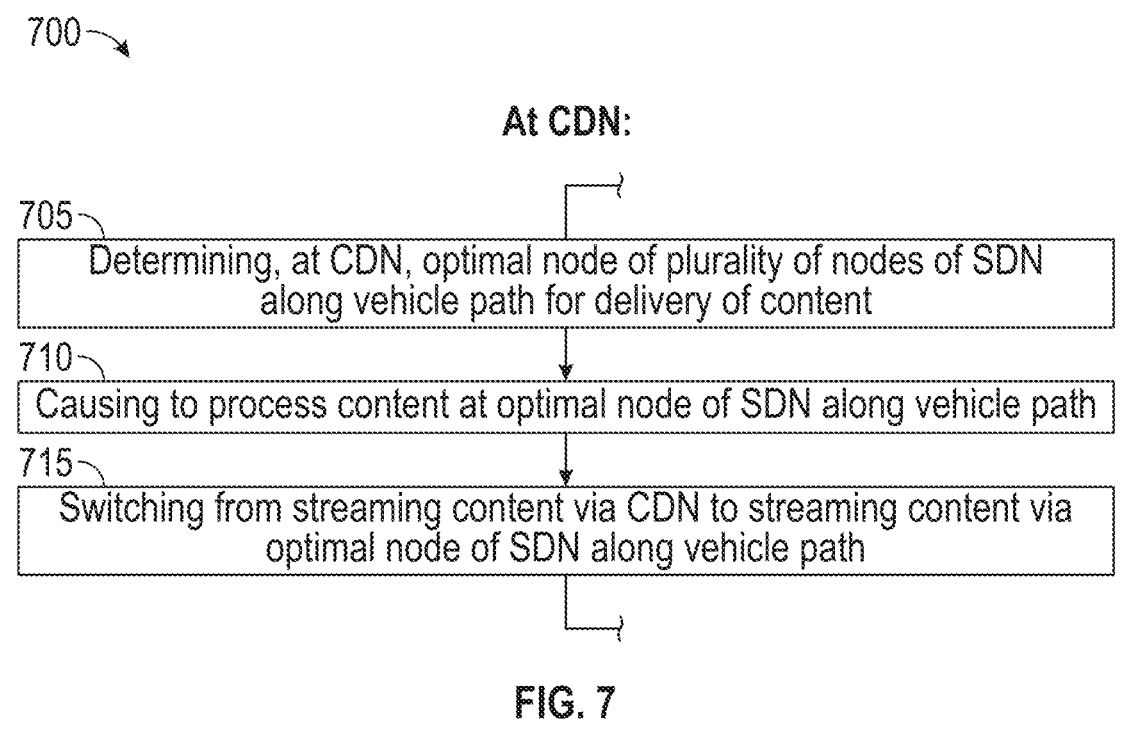

At CDN:

705 —

Determining, at CDN, optimal node of plurality of nodes of SDN along vehicle path for delivery of content

710 —

Causing to process content at optimal node of SDN along vehicle path

715 —

Switching from streaming content via CDN to streaming content via optimal node of SDN along vehicle path

FIG. 7

CONTENT DELIVERY AND DATA EXCHANGE FOR IN-VEHICLE DEVICE IN VEHICULAR ENVIRONMENT USING STORAGE NETWORK

FIELD OF THE DISCLOSURE

The present disclosure relates to the automotive industry, content delivery, video services, content processing, connectivity during travel, broadband during travel, gaming during travel, and related technologies.

SUMMARY

In an approach, a cooperative roadside unit (RSU) caching policy is proposed to reduce average download delay in vehicular content delivery networks (VCDNs) at a T-junction by classifying vehicles into four types based on entry and exit points. The proposed RSUs with cache capabilities store content locally and manage download performance compared to base stations. A fast simulated anneal (FSA) algorithm is proposed to replace conventional popularity-based caching policies. Simulation results suggest reductions in average download delay, but actual deployment remains speculative.

With these and other approaches, problems with latency and bandwidth and a need for robust connectivity remain. Edge computing aims to reduce latency and bandwidth usage by processing data closer to where loads are generated, but edge computing faces hardware limitations, data transmission overhead, and a need for efficient task offloading. In vehicular networks, maintaining connectivity and ensuring reliable communication between moving vehicles and the proposed RSUs are challenging due to dynamic network topologies and limited channel bandwidths. Also, caching strategies should account for high mobility, as vehicles may pass through multiple proposed RSUs, making it difficult to access complete content from a single caching node. Addressing these challenges requires advancements in communication protocols, data management techniques, and the development of scalable and secure edge computing architectures.

To help address the limitations and problems of these and other approaches, smart storage devices (SSDs) within an SSD network connect with a content delivery network (CDN). An SSD network is a type of storage device network (SDN). In some embodiments, the connection comprises a steering service that uses vehicle location data from a playback API to guide clients in accessing content. The content is retrieved, for example, from a specific node of an SSD network along a route of the vehicle. Another node of the SSD network on the route may be instructed to transfer content to the vehicle based on identifiers like streaming session ID or vehicle ID, potentially from specific segments or byte ranges. In some embodiments, an aggregation of nodes in a region are considered a network or site.

The CDN actively pushes or publishes content to SSDs based on factors like content popularity and the number of traveling vehicles requesting content. For example, the SSDs may be located in a region, in an area, on an interstate highway, along a street, within a ZIP code, or the like. User devices receive live content, like sports games, which may be slightly time-shifted. SSDs can perform trick-play functions, such as rewinding a live sports game, using cached content. For example, the SSDs can perform trick-play functions instead of the client or user device requesting content from a server. Also, for example, if a nearby node has content and a trick-play function is requested, then content is fetched from the nearby node, in some instances, even if the client is streaming from an edge server (i.e., not streaming content from the SSD). SSDs extend the capabilities of an existing CDN, with the CDN selectively publishing content to SSDs based on various criteria, including content popularity, ongoing streaming sessions, and connectivity coverages.

In some embodiments, a method comprises content delivery and data exchange in a vehicle using an SDN and a CDN. The method comprises at least one of streaming content, processing (e.g., user and/or system) requests, controlling video-on-demand (VOD) content, controlling live content, providing trick-play options, utilizing transfer protocols, utilizing drones, combinations of the same, or the like. For example, the in-vehicle device streams content from the CDN, a steering service determines the optimal SDN node based on the vehicle's location, and (e.g., conditionally) switches streaming to the SDN node. In some instances, switching is based at least in part on a determination that switching to the SDN node and/or network is expected to improve one or more streaming metrics (e.g., streaming quality). Also, for example, a steering service acts in a coordinating function, i.e., configuring a client device to retrieve content from one or more sources. Further, for example, the steering service is configured to signal information in a manifest. In addition, for example, content requests are transmitted to the CDN, which archives and segments content for delivery via the SDN. Moreover, for example, one or more (e.g., user and/or system) requests trigger data transmission to a cloud service, which processes and delivers content from the CDN to the SDN, then to the vehicle. Furthermore, for example, live content is delivered via real-time streaming (e.g., via CDN) and switched to the nearest SDN node. Additionally, for example, users can select trick-play options, upload additional content, and confirm uploads. Still further, for example, content is transmitted using various protocols, segmented for sequential download, and involves real-time geo-location and vehicle-to-infrastructure (V2I) communication. Even further, for example, drones can deliver content from the SDN to the vehicle, navigate based on geo-location, and transmit content wirelessly.

In some embodiments, a method comprises content delivery and data exchange (e.g., transmitting and/or receiving information, such as requests, analytics, manifests, reports, or the like, to and/or from a CDN and/or SDN) in a vehicle using an SDN with multiple nodes and a CDN. An in-vehicle device performs the method by streaming content from the CDN to the vehicle. The in-vehicle device accesses the vehicle's location along a path of the vehicle and information about content availability from the CDN. Based on the vehicle's location and content availability, an optimal SDN node for content delivery is determined. The content is then processed at the optimal node, and streaming switches from the CDN to the SDN node. For example, processing at the optimal node includes at least one of caching content (e.g., at a constant bitrate). Also, for example, where storage at the optimal node is relatively large, processing at the optimal node includes saving one or more renditions (e.g., bitrate/resolution pairs) of content. Further, for example, the optimal mode is configured to receive content from a CDN, process the content (e.g., transcode the content to a higher or a lower bitrate), and serve the processed content to one or more clients (e.g., one or more devices in one or more vehicles passing the optimal node).

Additionally, the method comprises receiving a request for content, transmitting the request to the CDN, which archives the content in real time at the SDN, and receiving content segments from the SDN.

For VOD content, the method comprises receiving a request and transmitting geo-location, route, or client data to a cloud service, which analyzes the data and transmits the content from the CDN to the SDN. The content is processed at the SDN and then received by the vehicle.

For live content, the method comprises receiving a request (e.g., a request from a device of a user) via a mobile network, transmitting a streaming request to the CDN, receiving the stream from the CDN, detecting the optimal SDN node near the vehicle, switching to streaming from the node, and receiving the content from the node.

The method also comprises receiving user selection of a trick-play option and performing the trick-play option, uploading additional content to the SDN based on a request, and confirming the upload completion.

The method comprises transmitting and receiving content via various transfer protocols, segmenting content into files for sequential download, and accessing real-time geo-location, pre-authorization, data navigation, and identification services via V2I communication.

The method comprises buffering (e.g., in memory), caching (e.g., in a CPU, memory, or the like), and providing a manifest file by requesting content from the CDN, which publishes the content to the SDN; receiving the manifest file with SDN locations; and buffering and/or caching a portion of the content. For example, buffering temporarily stores data to control differences in speed between data producers and consumers, ensuring smooth data transfer, like when streaming a video. Buffers may be provided in a main memory (e.g., of one or more nodes of an SDN) and hold data being transferred. Also, for example, caching speeds up data access by storing copies of frequently accessed data, reducing the time needed to retrieve the data. Caches may be located in a CPU, RAM, on disk, or the like, and store copies of data for quicker access. Where either buffering or caching are used herein, buffering and/or caching may occur unless context indicates otherwise.

The method comprises, upon receiving a request for content at the in-vehicle device, requesting the content from the SDN. A drone then receives the content from the SDN, navigates to the vehicle's location, and transmits the content to the vehicle.

Additionally, when the in-vehicle device receives a request for content, the in-vehicle device transmits geo-location, route, or vehicle information to a cloud service. The SSD receives the information from the cloud service, and a drone is prepared to transmit the content. The drone navigates to the vehicle's location, identifies the vehicle, and transmits the content to the vehicle.

The method also comprises receiving a request for content at the in-vehicle device and, based on a drone receiving a transfer request from the CDN, causing the drone to navigate to the SDN's location.

Furthermore, upon a drone receiving a transfer request from the vehicle, the drone transmits or receives the content to or from the SDN. The drone can also transmit or receive content to or from the vehicle, a web service, or the CDN.

The drone receives information from the CDN to prepare for content delivery via the SDN, receives the content from the CDN, and transmits the content to the SDN. The drone can deliver the content to the SDN using memory devices, navigate to the SDN's location, and transmit the content wirelessly. Finally, the SDN can transmit the content from one node to another using a peer-to-peer protocol.

In some embodiments, a method comprises content delivery and data exchange in a vehicle using an in-vehicle device and a CDN, performed by an SDN with multiple nodes. The method comprises streaming content from the CDN to the vehicle by accessing the vehicle's location along a path of the vehicle, requesting content availability (e.g., the steering service is configured with information regarding availability of content at one or more locations for storage of cached content, and/or whether the requested content is available at a node along the travel path of a vehicle, and/or whether content is not available), and determining an optimal SDN node for content delivery based on the vehicle's location and content availability. The content is processed at the optimal node, and streaming switches from the CDN to the SDN node.

Additionally, when the in-vehicle device receives a request for content, the in-vehicle device transmits the request to the CDN, causing the SDN to receive and archive and/or cache the content in real time. One or more content segments are then transmitted from the SDN to the in-vehicle device, which requests subsequent segments via high-speed data transfer. For example, the one or more content segments may be high-quality segments, and/or available at a constant bit rate, and/or at multiple bit rates.

For VOD content, the method comprises the in-vehicle device transmitting geo-location, route, or client data to a cloud service, which analyzes the data and transmits the content from the CDN to the SDN. The content is processed at the SDN and then transmitted to the in-vehicle device.

For live content, the method comprises the in-vehicle device transmitting a streaming request to the CDN, receiving the stream associated with the request (e.g., one or more segments of a movie) at the SDN, detecting a node (e.g., an optimal node of the SDN, and/or a node near the vehicle, and/or a particular node in the SDN), switching to streaming from the node, and receiving the content from the node. For example, one or more nodes may be independent, i.e., independently accessible by the CDN. Also, for example, each of a plurality of nodes may have its own IP address. Further, for example, a plurality of nodes (e.g., in the same area) may be associated with each other and linked to a controller. In addition, for example, one node of a plurality of nodes may be a primary (or controller) node, which receives content and makes content accessible to one or more secondary nodes (e.g., for caching the content). Moreover, for example, the primary node. This primary (or controller) node may be directly addressable.

The method also comprises receiving user selection of a trick-play option and performing the trick-play option. Also, for example, additional content (e.g., video of an accident) is received from the in-vehicle device (and/or a device connected to the in-vehicle device) via the SDN, and upload of the additional content is confirmed upon completion.

The method comprises receiving and transmitting content via various transfer protocols, segmenting content into files for sequential transmission, and accessing real-time geo-location, pre-authorization, data navigation, and identification services via V2I communication.

Finally, the method comprises buffering and providing a manifest file by requesting content from the CDN, which publishes the content to the SDN, receiving the manifest file with SDN locations, and buffering a portion of the content.

In some embodiments, a method comprises live content delivery and data exchange in a vehicle using an SDN with multiple nodes and an in-vehicle device, performed by a content delivery network (CDN). The method comprises streaming live content from the CDN to the vehicle by accessing the vehicle's location along a path of the vehicle and requesting live content availability from the CDN. The CDN determines the optimal SDN node for content delivery based on the vehicle's location and content availability. The live content is processed at the optimal node, and streaming switches from the CDN to the SDN node.

Additionally, when the in-vehicle device receives a request for live content, the in-vehicle device transmits the request to the CDN. The CDN receives the request, causing the SDN to archive the live content in real-time. High-quality live content segments are then transmitted from the SDN to the in-vehicle device, which requests subsequent segments via high-speed data transfer.

For processing live content at the optimal SDN node, the in-vehicle device transmits geo-location, route, or client data to a cloud service. The cloud service analyzes the data and transmits the live content from the CDN to the SDN. The live content is processed at the SDN and then transmitted to the in-vehicle device.

For switching from CDN to SDN streaming, the in-vehicle device transmits a streaming request to the CDN, and the SDN receives the live content stream. Upon detecting the optimal SDN node near the vehicle, streaming switches to the node, and the live content is received from node.

For example, the method comprises receiving and transmitting live content via various transfer protocols, segmenting live content into files for sequential transmission, and accessing real-time geo-location, pre-authorization, data navigation, and identification services via V2I communication.

Finally, the method comprises caching and providing a manifest file by (e.g., in response to) requesting live content from the CDN, which publishes the content to the SDN. The in-vehicle device receives the manifest file with SDN locations, requests the live content from the SDN, and buffers a portion of the live content.

As a result of the one or more embodiments presented herein, one or more technical improvements are achieved. For example, methods and systems are configured for delivering and exchanging content with a vehicle. Real-time data, such as the vehicle's location and content availability, are utilized to optimize content delivery routes and ensure seamless streaming experiences. In order to ensure efficient and uninterrupted content delivery to moving vehicles, an optimal SDN node is dynamically selected based on the vehicle's location and content availability, switching from CDN to SDN for better streaming performance and quality of experience. Real-time content requests are controlled to ensure quick access. For example, requests are transmitted to the CDN, which archives (e.g., publishes to and/or caches at) the content in real time at the SDN, allowing for efficient retrieval of content segments. Adaptive streaming for VOD and/or live content is provided. For example, different types of content requests (e.g., VOD, live streaming, or the like) are controlled as disclosed herein. Also, for example, for VOD, a system utilizes geo-location and route data to fetch content from the CDN to the SDN. Further, for example, for live content, a nearest SDN node is detected to switch streaming from the CDN to the SDN. Interactive content features like trick-play options are provided. For example, user-selected trick-play options are supported. Also, for example, additional content is uploaded to the SDN based on requests. Reliable content transmission over various networks is ensured. For example, content is transmitted and/or received via one or more transfer protocols. Also, for example, content is segmented for sequential download. Real-time vehicle data is utilized for content delivery. For example, real-time geo-location, pre-authorization, and data navigation services are accessed via V2I communication. Content may be delivered to vehicles (or remote locations, like remote pipelines) in areas with limited network coverage via drone. For example, one or more drones receive content from the SDN, navigate to the vehicle's location or the remote location, and transmit the content wirelessly. Content is efficiently distributed across the SDN. For example, the SDN transmits content from one node to another using a peer-to-peer protocol, enhancing distribution efficiency.

Related systems, devices, non-transitory, computer-readable media, and the like are also provided.

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

Figure 1:
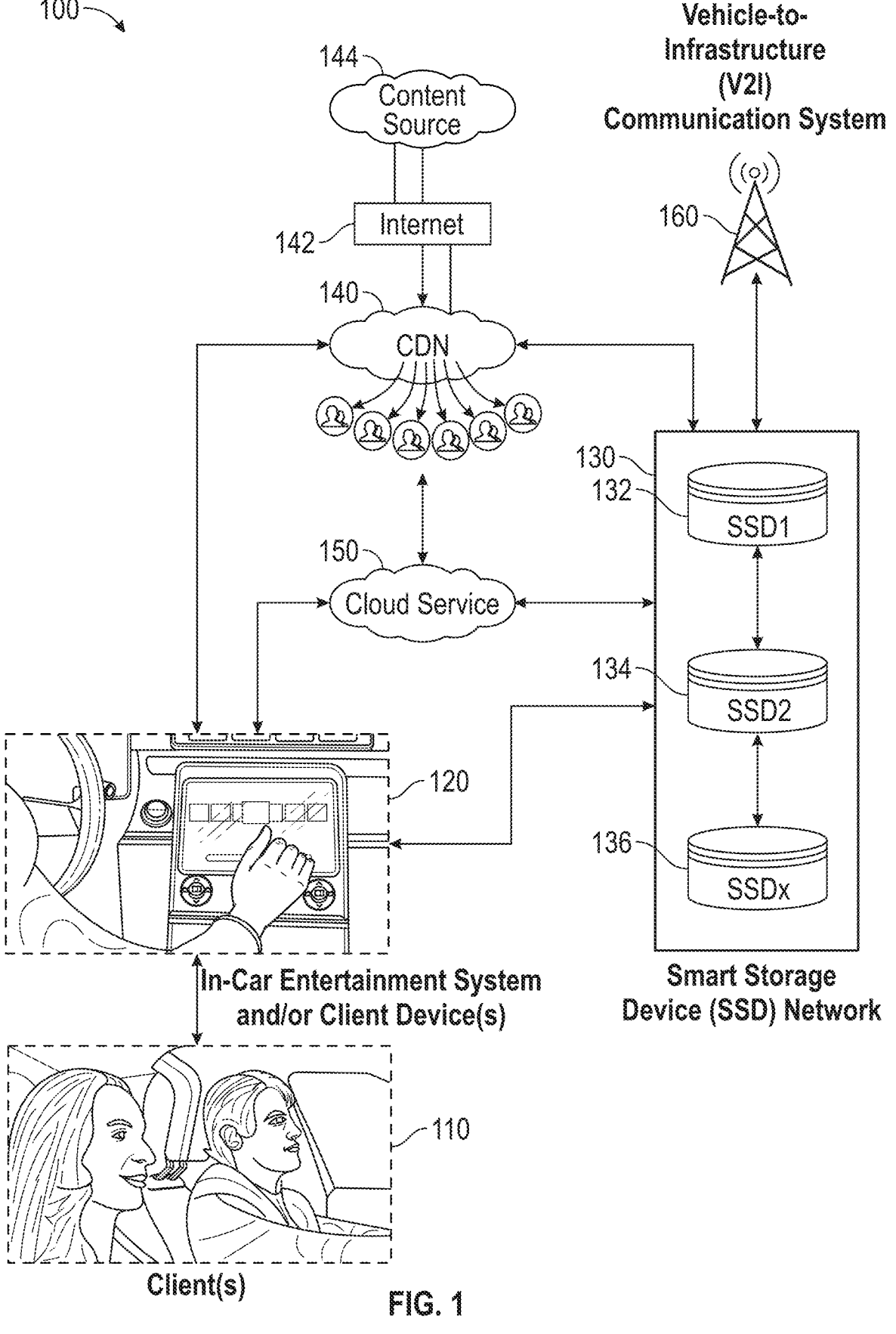
FIG. 1 depicts an example system for content delivery and data exchange in a vehicle utilizing an in-vehicle entertainment device, an SDN, and a content delivery network (CDN), in accordance with some embodiments of the disclosure.
Figure 2:
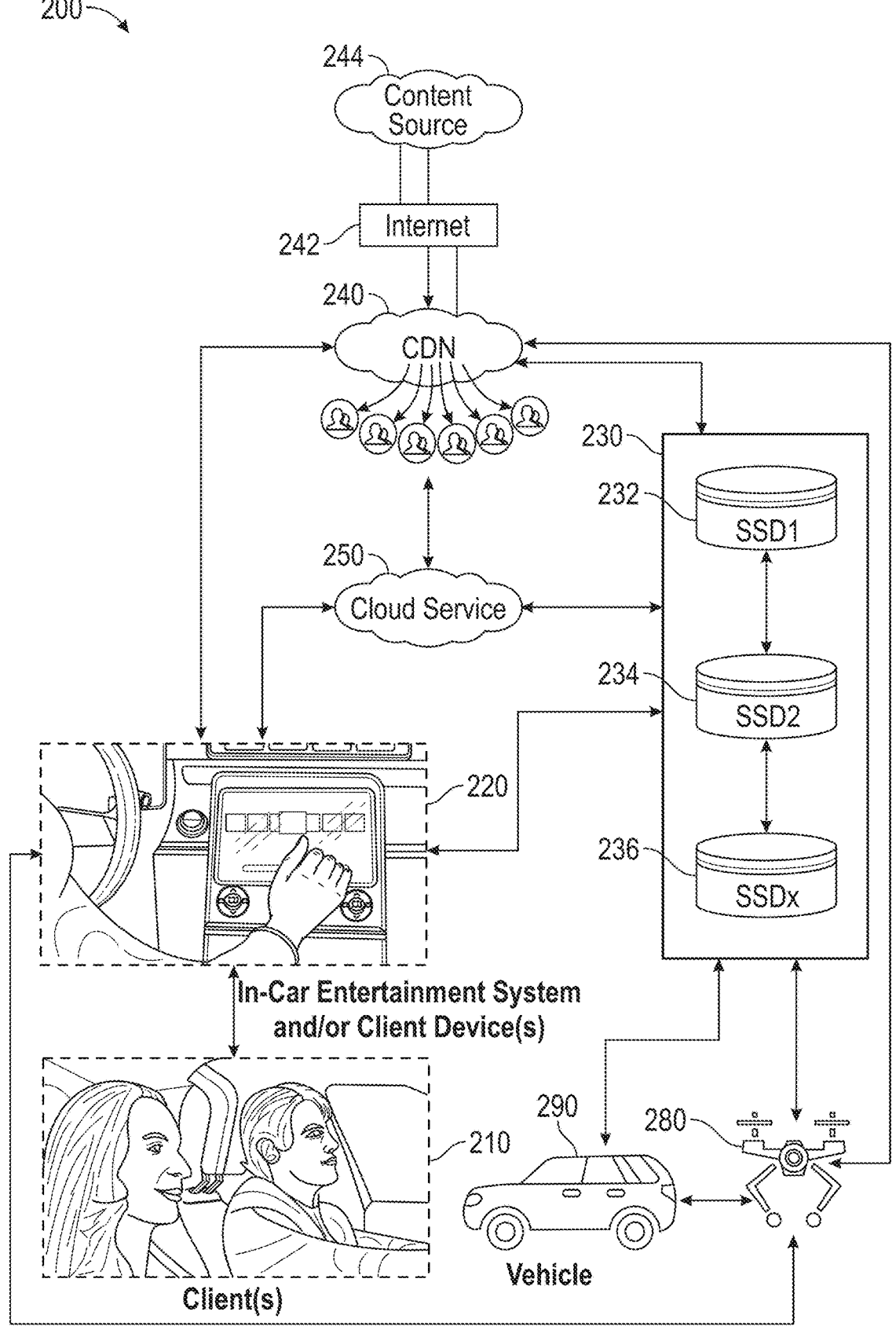
FIG. 2 depicts an example system for content delivery and data exchange in a vehicle utilizing an in-vehicle entertainment device, an SDN, a CDN, and a drone, in accordance with some embodiments of the disclosure.
Figure 3A:
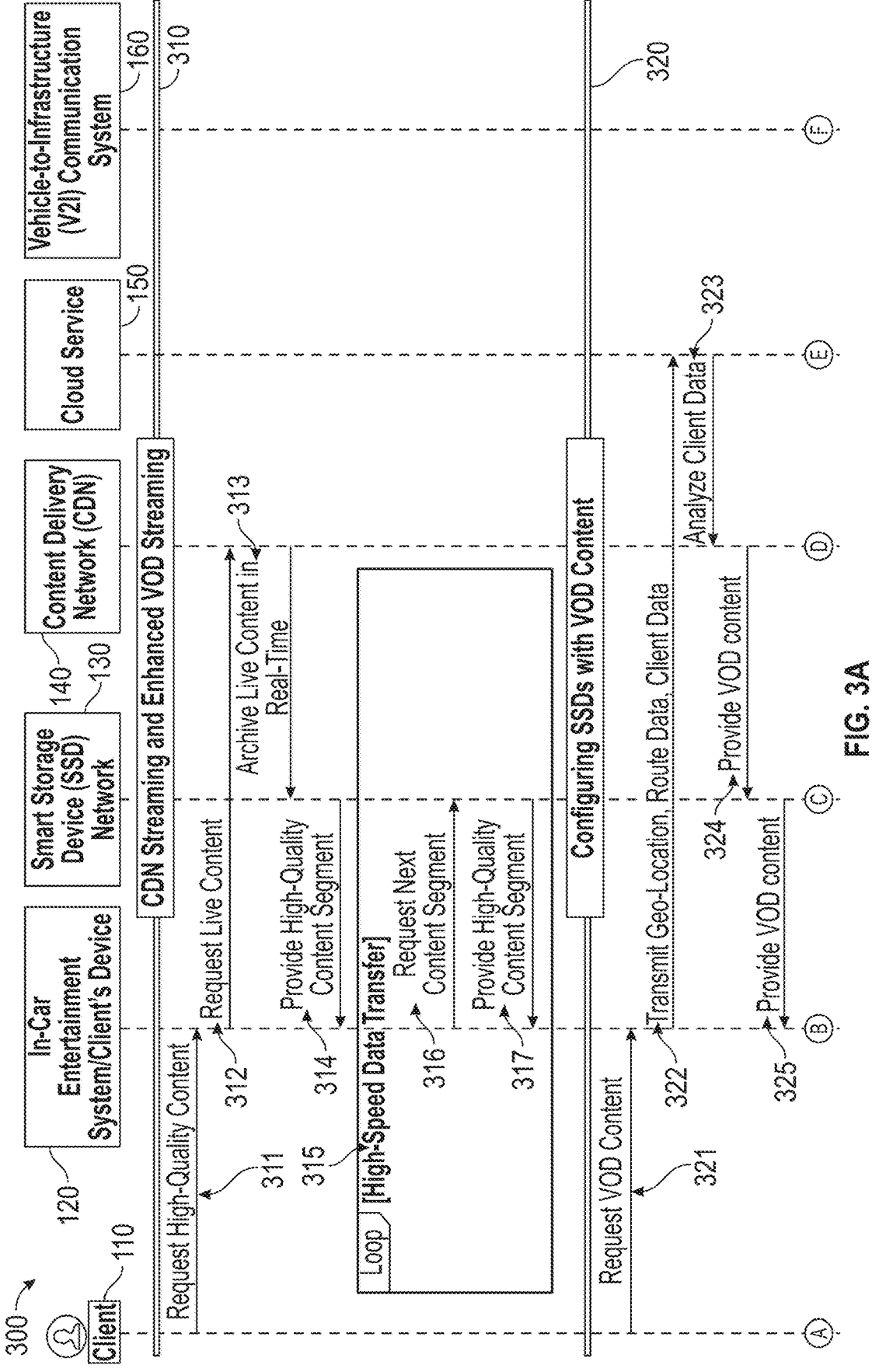
Figure 3B:
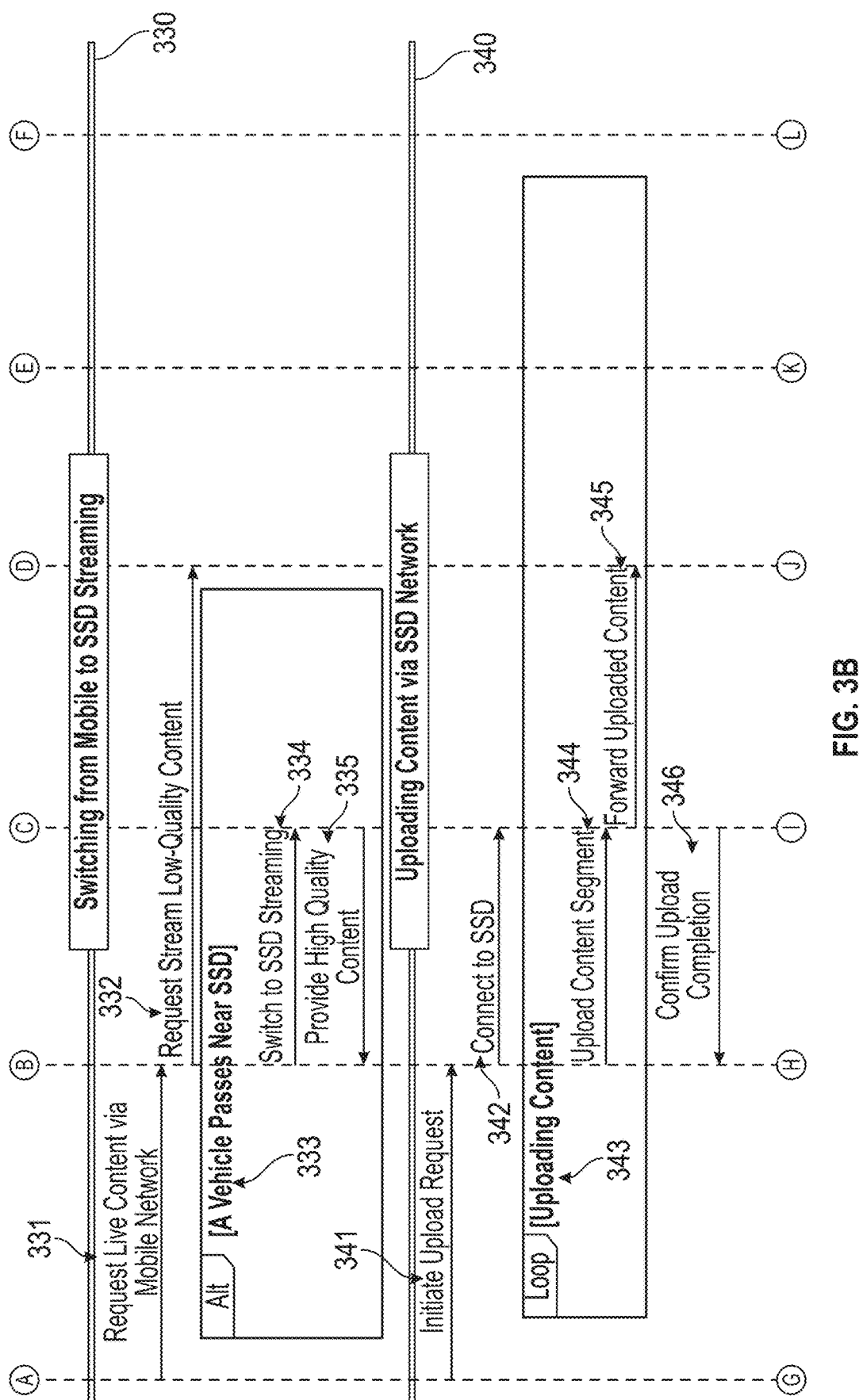
Figure 3C:
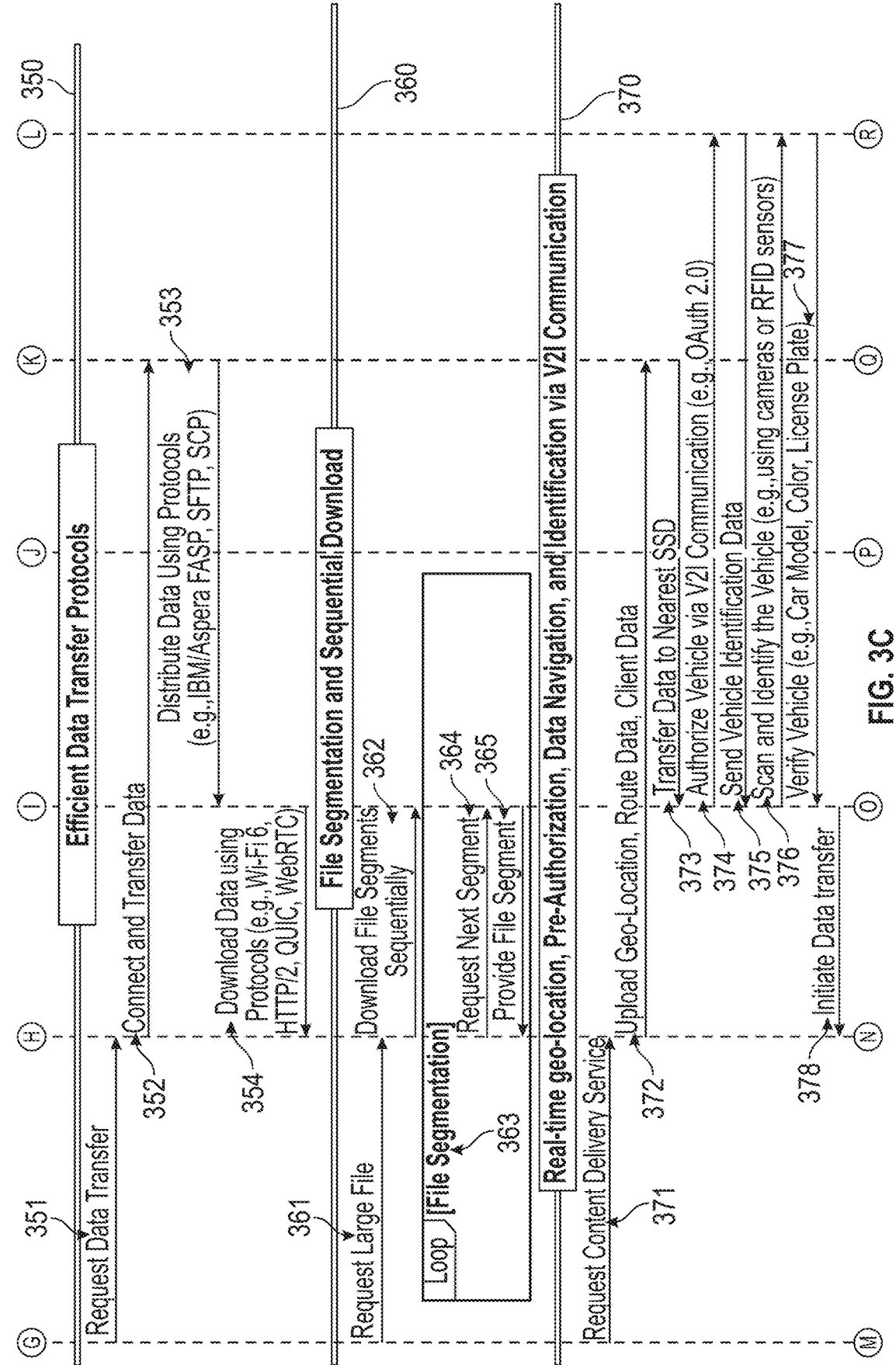
Figure 3D:
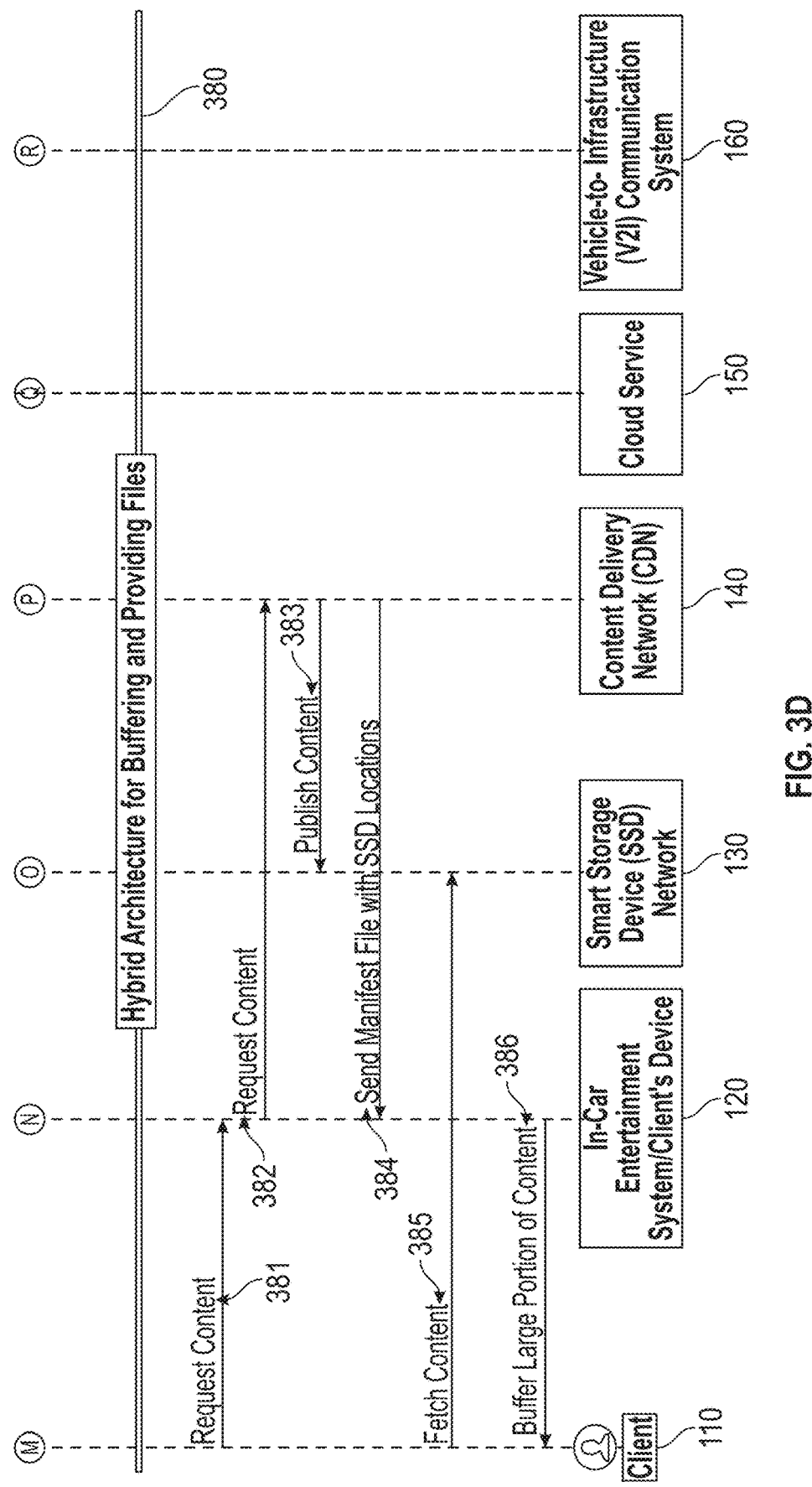
Figure 4A:
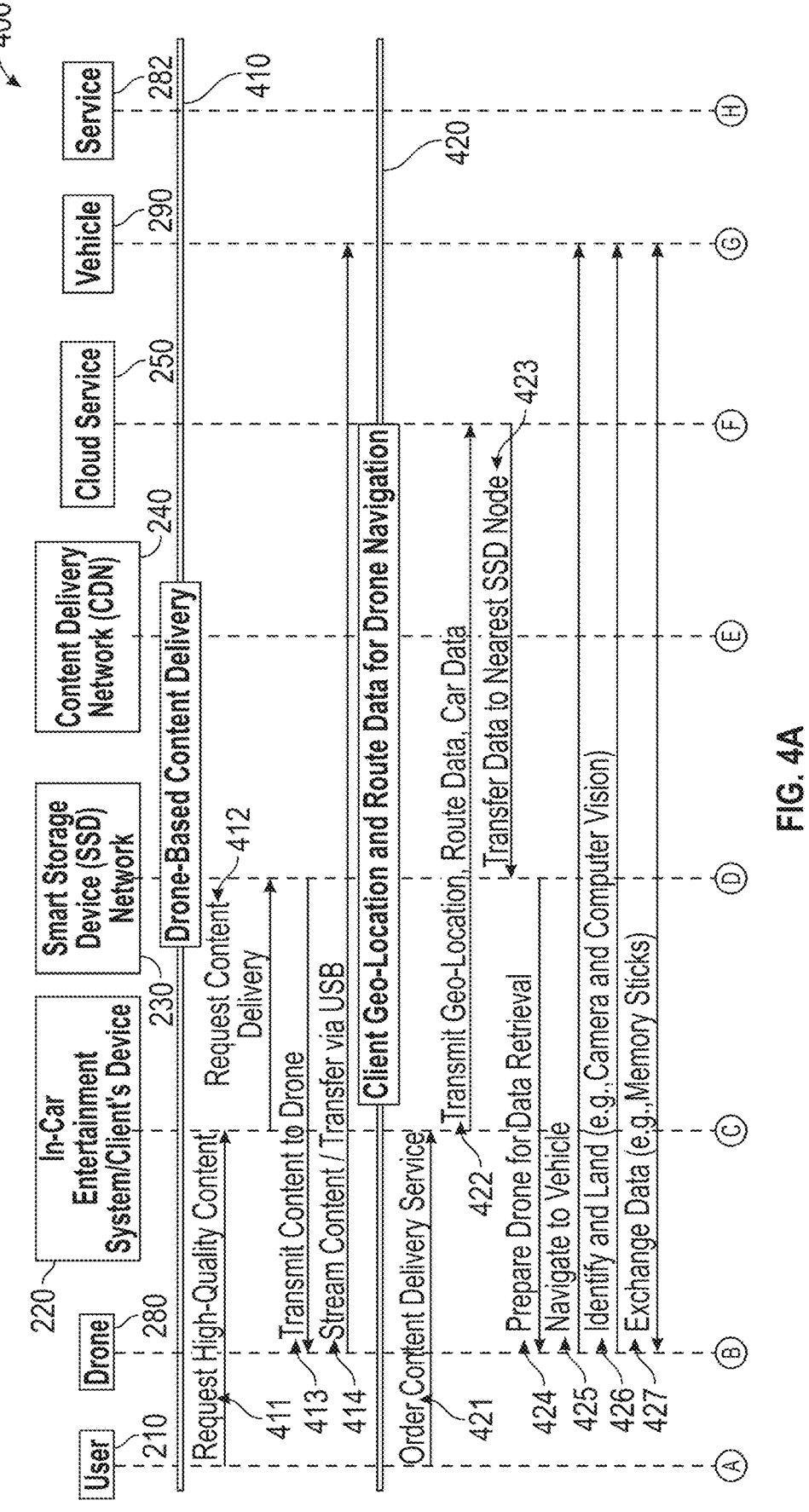
Figure 4B:
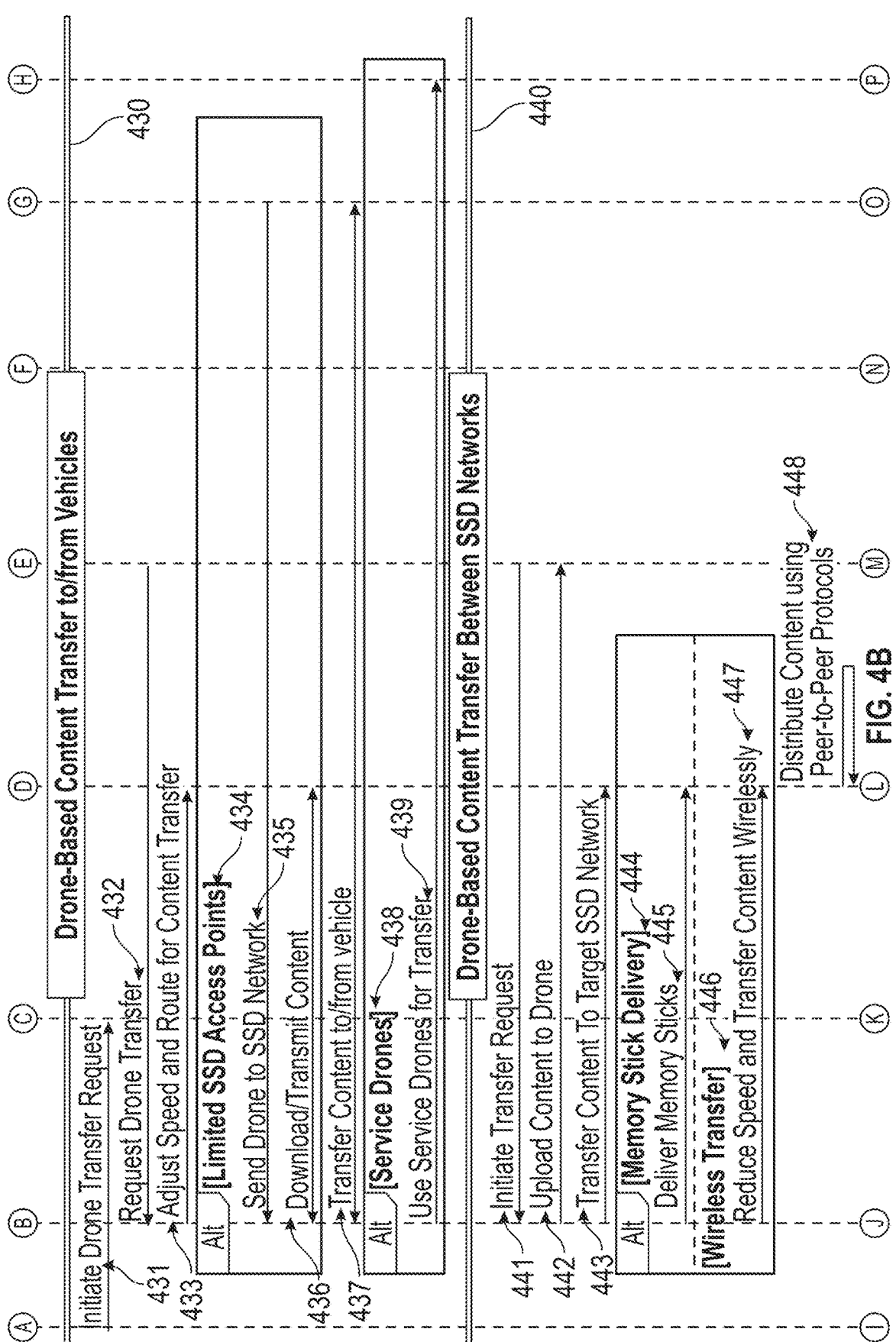
Figure 4C:
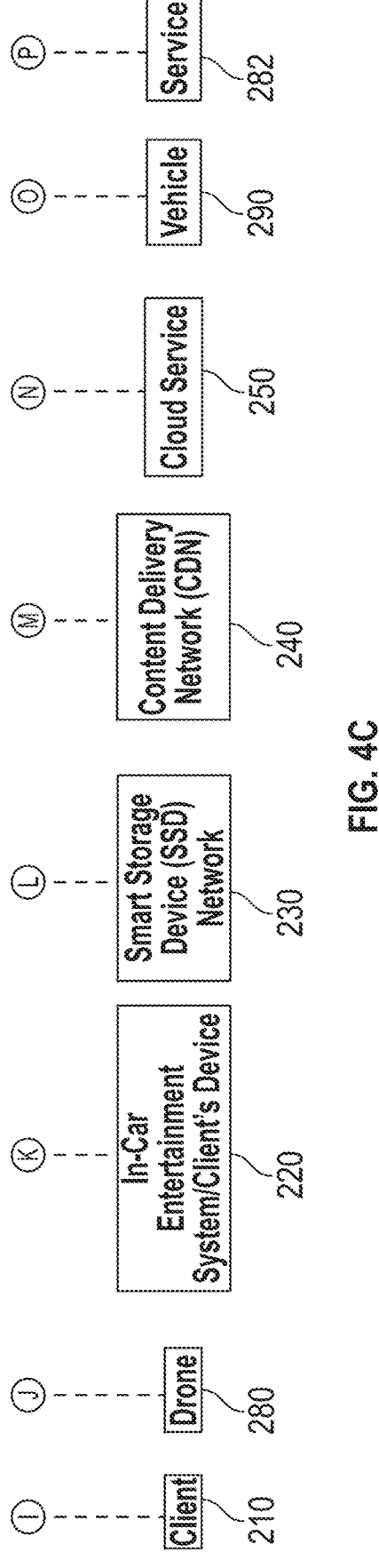
Figure 8:
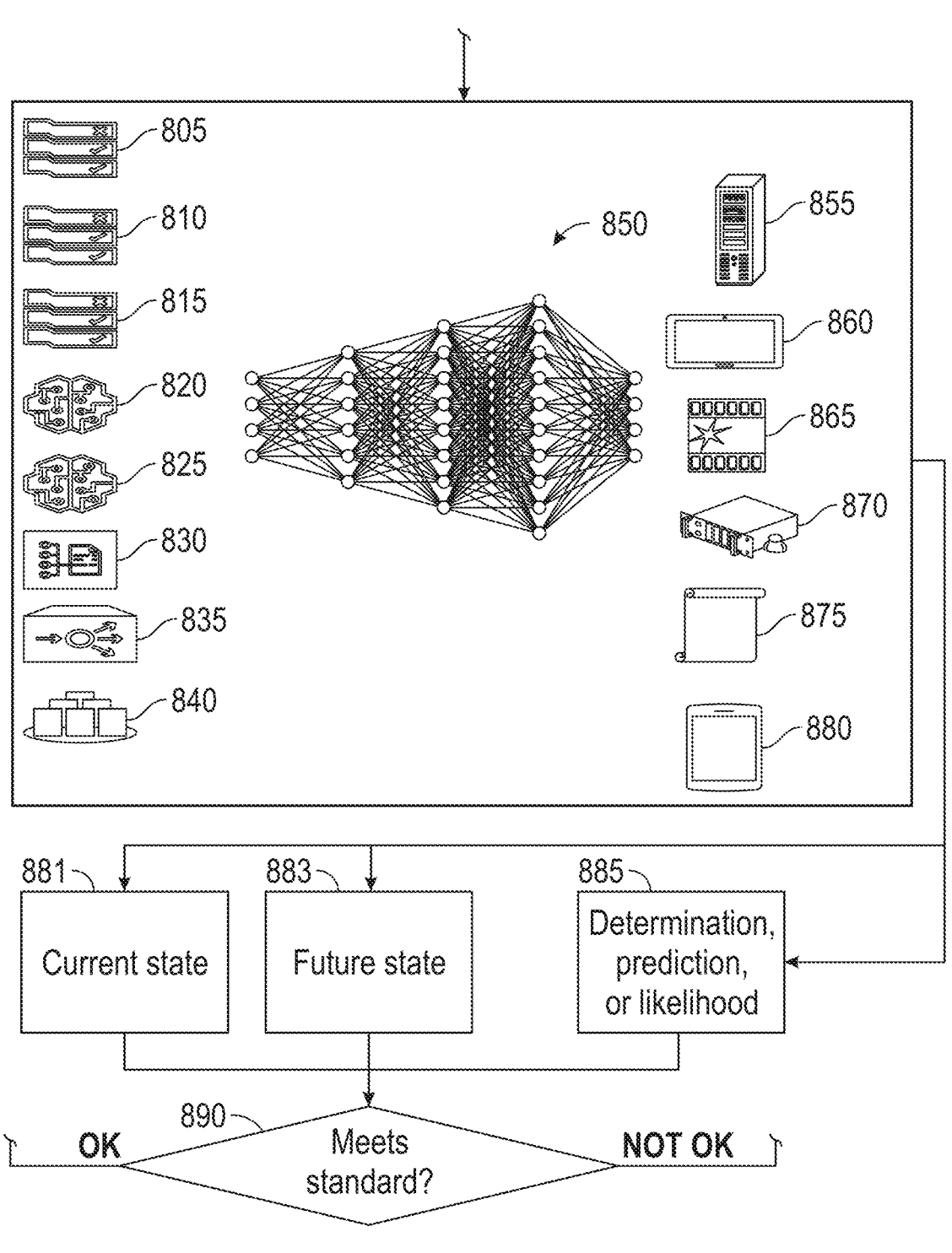
Figure 9:
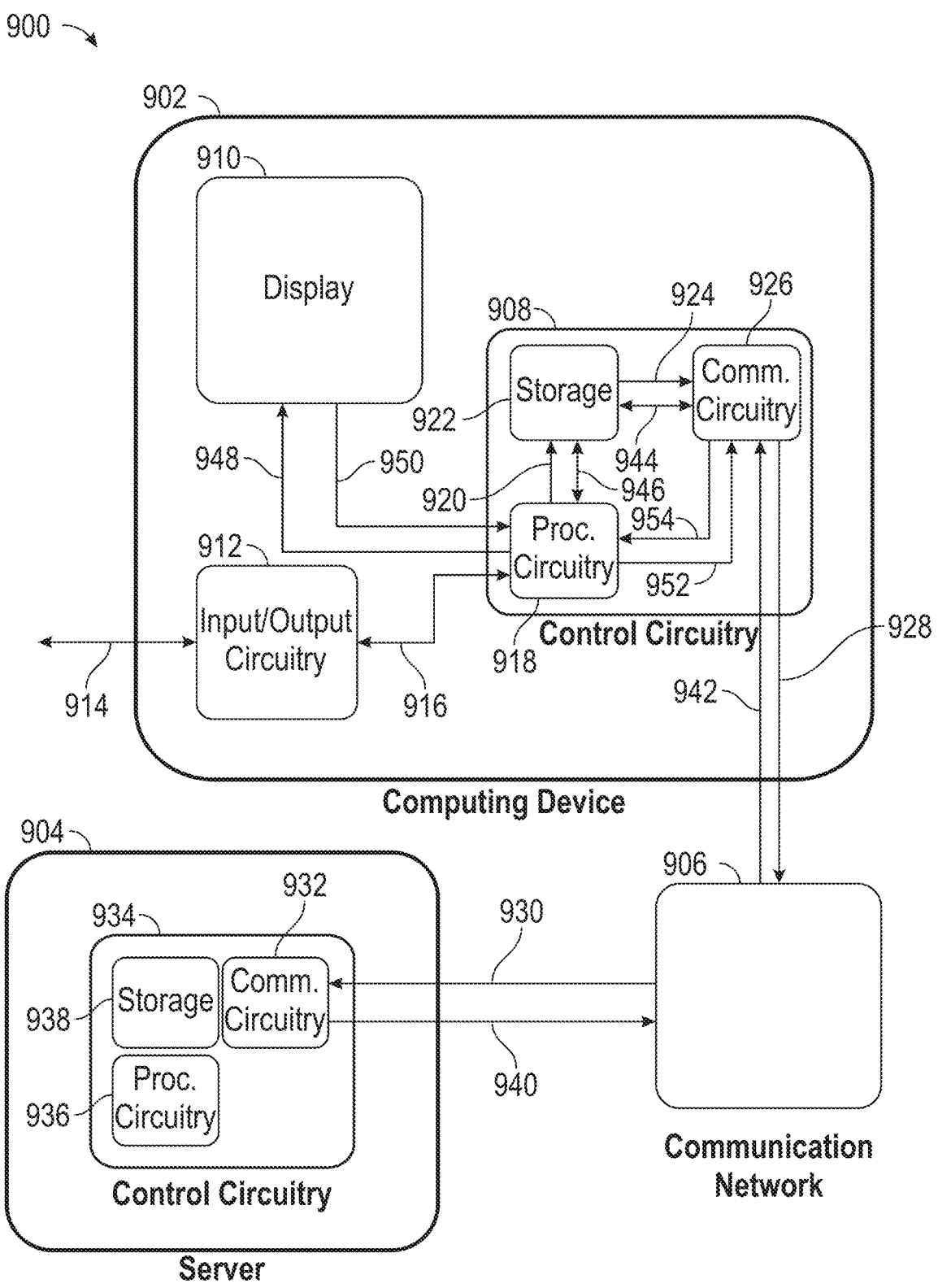

FIG. 3, including FIGS. 3A-3D on four sheets, is a flow diagram of an example process for the example system of FIG. 1, of which FIG. 3A illustrates subprocesses, FIG. 3B illustrates additional subprocesses, FIG. 3C illustrates additional subprocesses, and FIG. 3D illustrates additional subprocesses, in accordance with some embodiments of the disclosure;

FIG. 4, including FIGS. 4A-4C on three sheets, is a flow diagram of an example process for the example system of FIG. 2, of which FIG. 4A illustrates subprocesses, FIG. 4B illustrates additional subprocesses, and FIG. 4C illustrates a lower portion of the flow diagram, in accordance with some embodiments of the disclosure;

FIG. 5 is a flowchart of an example process for content delivery and data exchange in a vehicle performed at an in-vehicle device, in accordance with some embodiments of the disclosure;

FIG. 6 is a flowchart of an example process for content delivery and data exchange in a vehicle performed at an SDN, in accordance with some embodiments of the disclosure;

FIG. 7 is a flowchart of an example process for content delivery and data exchange in a vehicle performed at a CDN, in accordance with some embodiments of the disclosure;

FIG. 8 depicts an example of an artificial intelligence system, in accordance with some embodiments of the disclosure; and FIG. 9 depicts an example of a communication system including a server, a communication network, and a computing device for performing the methods and processes, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

In the modern era of connectivity and high-speed internet, the demand for uninterrupted, high-quality delivery is paramount, particularly for vehicles in transit. In various embodiments presented herein, seamless streaming, data exchange, and/or content delivery is provided as one or more vehicles move through various regions. The seamless streaming, data exchange, and/or content delivery is ensured even when networks are experiencing fluctuating connectivity; is provided for simultaneous consumption of live content and VOD services; and is provided with real-time or near-real-time data exchange. Improved infrastructures are provided to deliver the seamless streaming, data exchange, and/or content delivery in real time or in near-real time in areas with limited coverage and/or high traffic density. In some embodiments, SSDs and drone technologies are provided.

In some embodiments, one or more SDNs or SSDs (e.g., as part of an SSD network) interface with a CDN. For example, each node within the SDN is uniquely addressed using Internet Protocol (IP) addresses, facilitating precise data routing and management. Also, for example, the interface between the CDN and one or more nodes of the SDN is established via Internet Service Provider (ISP) networks, optical networks, or similar high-speed communication channels. Content delivered by the CDN is accessed and utilized by the SDN nodes. Further, for example, the nodes within the SDN, identified by their IP addresses, request and receive content from the CDN. In addition, for example, the interface provides real-time data processing and/or dissemination. Moreover, for example, other suitable interfaces provide the interface between the CDN and the SDN. Furthermore, for example, the interface between the CDN and one or more nodes of the SDN includes a wireless communication system (e.g., 5G) configured for high-speed, low-latency connectivity for real-time data transmission and processing. Additionally, for example, the interface between the CDN and one or more nodes of the SDN includes one or more Wi-Fi hotspots configured to provide localized network access. Still further, for example, the interface between the CDN and one or more nodes of the SDN includes optical fiber networks configured for high bandwidth and low latency. Even further, for example, the interface between the CDN and one or more nodes of the SDN includes satellite communication (e.g., for remote or underserved areas).

For example, the interface comprises a steering service. Also, for example, the steering service accesses location information of a vehicle (e.g., from a playback API service). Further, for example, using the location information, the steering service directs a client to access content. In addition, for example, the content is accessed from one or more specific SSD networks along a route of travel of the vehicle. Moreover, for example, a second SSD along the route of travel of the vehicle is instructed to initiate a content transfer to the vehicle (e.g., based on streaming session ID, vehicle ID, or the like). The content transfer may begin or start from a specific segment and/or byte range. Furthermore, for example, a CDN is configured to actively push content to SSDs based on content popularity and/or a number of vehicles requesting the content along a series of SSDs (e.g., along an interstate highway). Additionally, for example, user devices are provided with one or more live content items (e.g., a sports game). Still further, for example, live content items are provided in a slightly time-shifted mode. Even further, for example, live content items are provided using the SSDs (e.g., SSDs that are available and that have access to the content or are pre-loaded with the content) to perform one or more trick-play functions (e.g., rewind through a live sports game) instead of receiving the content from a server. Yet further, SSDs are provided as an extension to an existing CDN. Further still, for example, the SSD network is configured so that the CDN selectively publishes content to the one or more SSDs based on multiple criteria (e.g., content popularity, existing streaming sessions, connectivity roadmap, or the like).

In some embodiments, one or more SSDs reduce a load on a video service. For example, instead of multiple client devices (e.g., in vehicles) relying on multiple CDNs to deliver content (e.g., VOD, live video, or the like) to users, where the multiple CDNs utilize a CDN steering service to steer or direct one or more sessions to different CDNs based on load, business logic, or the like, SSDs are provided (e.g., in city streets, along roadways, along interstates, or the like) to serve content to vehicles and/or to devices within the vehicles (including semi-autonomous or autonomous vehicles). The SSDs improve the quality of service of streaming services to the devices and/or vehicles. Additionally, fixed SSDs serve one or more users at fixed locations (e.g., in a building that has a network connection to the SSD).

As used herein, an SSD is, for example, any network-enabled device that interfaces with a CDN and/or an edge server within a CDN. The SSD can receive session information associated with a moving object. A steering service coordinates the transfer of data (e.g., media content) from one or more SSDs to one or more vehicles in the vicinity of the SSD (e.g., passing by the SSD). The steering service tracks how much content was transferred from the first SSD and makes such information available to another SSD along the navigation route of the vehicle. By making the information available to another SSD, the client device (e.g., vehicle, phone, or the like) resumes the transfer of content from another SSD along the navigation path. The steering service also tracks any content transfer that occurs in between SSDs (e.g., a player may have retrieved content directly from an edge server after the initial transfer from the first SSD).

In one embodiment, the amount of content transferred from one SSD depends on at least one of a number of SSDs along a navigation path, a distance between SSDs, a speed of the vehicle, a coverage map of a cellular network along the navigation path, combinations of the same, or the like.

In one embodiment, a vehicle (e.g., a semiautonomous or autonomous vehicle) adjusts, or a driver is prompted to adjust, a speed of the vehicle to maximize to an amount of content (e.g., a number of bytes and/or a number of segments) that is transferred.

An example of an SSD is a storage device located at a "smart pole." Also, for example, a multifunctional smart pole is provided. The multifunctional smart pole is used, for example, for purposes including charging of electric vehicles, drones, or the like. Further, for example, a smart pole is provided to deliver content to nearby buildings, homes, or the like. In addition, for example, the smart pole incorporates sensors, electronics, and software controls. Moreover, for example, a smart pole with an SSD is configured for content delivery, traffic management, monitoring air quality, detecting street flooding, combinations of the same, or the like. Furthermore, for example, SSDs are integrated within smart poles and/or coupled to smart poles. The SSD/smart pole is configured to deliver content to one or more user devices and/or vehicles. The content delivery may, for example, be based on a geographical location and/or how far the SSD/smart pole is from an edge server.

In some embodiments, integration of smart poles and edge computing, improvement of urban infrastructure, and improvement of vehicular communication technologies are provided. For example, the smart poles are advanced streetlights equipped with sensors, communication technologies, and edge computing power. Also, for example, the smart poles are distributed throughout cities to provide local data processing and interaction with the environment. Further, for example, the smart poles manage network traffic to the cloud by processing data locally, supporting applications such as environmental monitoring, drone operations, augmented reality, and public safety. In addition, for example, the smart poles are deployed to ensure modularity. Moreover, for example, the smart poles are deployed with at least one of sensor and actuator selection, suitable connectivity protocols, consideration of street characteristics, the needs of the general population, combinations of the same, or the like.

In one embodiment, the CDN pushes content (e.g., live content) to specific SSDs based on a number of vehicles receiving live content (e.g., a popular live sports game). In other embodiments, the CDN pre-warms some SSDs with (e.g., VOD) content or a portion of the content (e.g., based on popularity, cellular coverage map, or the like).

In one embodiment, a hybrid architecture is provided for buffering and/or broadcasting one or more files using a CDN with one or more strategically placed SSDs. For example, one or more advanced data transfer protocols are provided to ensure continuous, high-quality content delivery. Also, for example, the CDN publishes content to the SSDs in one format (e.g., at a constant bitrate).

In one embodiment, the CDN streams live content and archives the live content to specific SSDs based on a number of vehicles streaming and receiving the content. Popular live content, such as a sports game, is streamed and archived to strategically placed SSDs along a route. As a vehicle (or a device in the vehicle) passes an SSD, the vehicle receives a high-quality portion of the content with a slight delay. Examples of delay are described in greater detail herein. Also, for example, regarding the slight delay, in an example scenario, a CDN publishes live content to one or more nodes as the CDN publishes content to one or more edge servers (e.g., during a game). The CDN publishing functions may introduce an end-to-end delay (e.g., on the order of about 7-10 seconds). As such, consumption of a "live" event may, in fact, occur at slightly different times for any given user depending, for example, on a given platform used for consuming the content (e.g., via cable, Advanced Television Systems Committee (ATSC) 3.0, over-the-top, via satellite, or the like). Further, for example, the vehicle receives a first 10 minutes of the content at a first SSD, then a next 10 minutes of the content at a second SSD, and so on. The system is configured to adapt the bitrate and/or quality based on a number of clients, traffic density, and available SSD devices. For example, in areas with fewer SSDs and/or more clients, the bitrate is reduced to ensure smooth playback and fast content download for multiple users. The client device buffers and continuously plays the content in a highest possible quality but with some delay (e.g., relative to the live event, or as described herein). Additionally, for example, the system provides VOD streaming, gaming services, and data exchange for vehicles moving through an SSD network using wireless communication protocols like 5G or Wi-Fi 6 for uninterrupted content delivery. For example, a driver requests high-quality content via an in-car entertainment system, and, as the vehicle approaches an SSD, the SSD wirelessly uploads the requested content directly to the in-car entertainment system. Also, for example, the content is divided into packets and transmitted from multiple SSD nodes along a route of the vehicle to ensure uninterrupted delivery.

In another embodiment, the CDN "prewarms" (i.e., configures in advance) SSDs with VOD content based on at least one of analysis of client requests, locations, expected client numbers with a similar content request, mobile or satellite coverage (e.g., with SSDs being more advantageous in areas with poor coverage and lower download and upload speeds), vehicle speeds, combinations of the same, or the like. For example, SSD networks are strategically placed in locations that maximize efficiency. Also, for example, a node of each SSD network has a download and/or upload bandwidth utilization targeting about 80% to about 90%. Further, for example, if usage exceeds 90%, one or more new nodes are added. In addition, for example, if usage falls below 80%, drones are employed and/or services are increased that use the SSD network. Moreover, for example, the number of SSDs in an area can be reduced if infrastructure (e.g., a main road) is relocated. Furthermore, for example, the CDN collects statistical data from client devices and/or drones to predict future VOD content needs. For instance, if client data from the client devices indicates an upcoming sports event in a city, the CDN prewarms one or more SSDs along a route with recent matches of teams involved in the upcoming sports event. Similarly, for example, if there are upcoming Presidential debates, the CDN loads one or more SSDs with previous debates and related content. Additionally, for example, a prediction is made (e.g., using a trained model and/or predictive engine, described herein), based on one or more pertinent inputs, whether one or more types of content are expected to be in demand by one or more user devices. Using such predictions, the SSD network effectively anticipates and delivers content to one or more devices. Still further, such predictive content delivery allows delivery of "catch-up" sessions of content of interest while traveling.

In another embodiment, client devices can switch from mobile cellular networks or satellite streaming to SSD streaming to improve content quality. Initially, a client watches low-quality live content, such as a World Cup match, using a mobile connection. Upon passing an SSD network, for example, while reaching a route (e.g., a toll road) equipped with the SSD network, the client switches to free (e.g., included in the toll road price) SSD streaming, which is configured for download and caching of one or more high-quality segments from the SSD network. The switching may be signaled in a manifest file. For example, a manifest file is generated for a player session based on a navigation route. The manifest file comprises locations of the SSDs from which a client might receive content. Also, for example, in order to transfer content, the playback API service may, in real time, instruct the client to receive content from an upcoming SSD by sending configuration data to kick off the data initiation phase (e.g., a handshake between the vehicle and the SDD). A semiautonomous or autonomous vehicle may (or a driver is prompted to) for example, adjust its speed based on information in the manifest file in order to retrieve a maximum number of segments from the SSD. A player of a device may operate in a flexible or elastic buffer mode where it can buffer a large portion of content (e.g., when streaming from SSDs).

In another embodiment, the client can rapidly upload content, such as videos and/or software, to the CDN via the SSD network. For example, the client device initiates an upload request. As the client device passes multiple SSDs, the device connects sequentially, uploading the content to the SSD network, which then forwards it to a central distribution center, ensuring complete transfer. For example, while passing multiple SSDs, the client device may upload all content and/or developed software, ensuring complete transfer, and uploads the content to the cloud before the device reaches a destination.

In another embodiment, content distribution between SSDs uses efficient data transfer protocols to ensure high-speed, secure file transfer. For example, protocols such as IBM Aspera, Fast and Secure Protocol (FASP), Secure File Transfer Protocol (SFTP), or Secure Copy Protocol (SCP) are used for content distribution between CDN and SSDs, and protocols like Wi-Fi Sixth Generation (Wi-Fi 6), Hypertext Transfer Protocol Version 2 (HTTP/2), Quick User Datagram Protocol (UDP) Internet Connections (QUIC), or Web Real-Time Communication (WebRTC) maximize the speed of content download or upload during the client device's passage through an SSD's stable reception area. These protocols offer low latency, high-speed data transfer and improved reliability for real-time communication.

In another embodiment, file segmentation controls cases where the client cannot immediately download and/or upload the requested content. For instance, if a vehicle (or device) cannot download an entire video from one SSD, the vehicle downloads subsequent segments from the next SSDs along its route, ensuring continuous access to high-quality content without overloading a single SSD.

In another embodiment, information (e.g., at least one of real-time geo-location, route data, vehicle model, vehicle color, vehicle license plate number, combinations of the same, or the like) is uploaded to a cloud service after ordering the content delivery service. The system uses protocols such as OAuth 2.0 and OpenID Connect combined V2I communication for identification and authorization. For example, the system prepares in advance by transferring data to the nearest SSD node along the client's route, and, when the vehicle nears an SSD node, cameras scan the area (or Radio Frequency Identification (RFID) sensors identify the vehicle) based on, e.g., the vehicle model, vehicle color, and/or vehicle license plate number. Once verified, the SSD node initiates the data transfer, ensuring the correct content is delivered to the authorization vehicle. The process comprises the client's device establishing a secure connection and obtaining authorization tokens using mobile connectivity, reducing the time need for authentication when the client enters the SSD network. Upon nearing an SSD, the client's device establishes a secure connection using Transport Layer Security (TLS). The client's device uses pre-obtained authorization tokens to quickly access the SSD's services, thus ensuring minimal delay in content transfer.

In one embodiment, the proposed system provides VoD streaming, game services, and/or data exchange for vehicles moving through a network of SSD nodes using drones for uninterrupted content delivery. For example, a client requests high-quality content via in-car entertainment systems or client devices such as tablets or smartphones. As the vehicle approaches, the SSD node uploads the requested content directly and/or wirelessly to a drone. The drone follows the vehicle, streaming content directly to the device.

In another embodiment, the client device's information (e.g., real-time geo-location, route data, vehicle model, color, and license plate number) is uploaded to a cloud service after ordering the content delivery service. The system prepares in advance by transferring the data to the nearest SSD node along the client device's route and requesting a drone to retrieve and deliver the data. The drone receives the coordinates and uses them for rough navigation to download, upload, or stream content to and/or from a vehicle. The drone activates cameras and computer vision algorithms for precise identification and landing to exchange hardware (e.g., memory sticks) and/or data with the client's vehicle.

In another embodiment, drones can transmit or broadcast content to or from vehicles and SSDs while moving. For instance, the client or CDN initiates a drone transfer request. Drones can be controlled to adjust speed or slightly alter route to quickly download or upload content. The drone control is useful if there are a limited number of SSD access points along a path, e.g., of a vehicle. Drones transfer content to and from vehicles. If many SSD devices are within the drone's range but not along the vehicle's path, the vehicle sends its drone to fly over the SSD network to download or upload content. Alternatively, a service with its drones can be used to ensure content delivery even in challenging locations.

In another embodiment, when there is no stable connection between SSD nodes, or between different SSD networks, or between SSDs and the CDN, drones can transfer content between the CDN and SSD networks, between SSDs, or between different SSD networks. For example, the CDN or SSD network initiates a drone transfer request when a stable connection is unavailable. The CDN uploads the content to a drone, which then transfers the content to the target SSD or another SSD network. Drones can perform the content transfer by delivering memory sticks to and/or from SSDs or via wireless communication by flying over SSDs and reducing speed. Once the content is delivered to one of the SSDs, the SSD can distribute the content to other SSDs in its network using peer-to-peer protocols, ensuring efficient content delivery and distribution despite connectivity issues.

One or more embodiments ensure continuous, high-quality content delivery and efficient data transfer for clients using a network of strategically placed SSDs. For example, when needed, drone-based content delivery systems provide additional support. Also, for example, pre-authorization and efficient node switching provide the system's reliability and performance.

In one embodiment, traveling vehicles can receive content directly from one or more smart poles along a route (e.g., the player operates in driving mode). For example, a media player may be experiencing constant rebuffering as it streams a movie from a streaming service via cellular. In such case, a steering service (e.g., within a CDN and/or operated by a video delivery service) may instruct the video player at the client to receive content from a smart pole that is along the route of the vehicle. The driving path of the vehicle might be known to the steering service, which determines if the movie being consumed is available at any smart pole along the user's route. The vehicle might receive a portion of the content. The steering service keeps track of how much content (e.g., number of bytes or a number of segments received from each smart pole). The tracking allows the steering service to instruct smart poles (e.g., numbered 2, 3, . . . , n) to push specific amounts of content to the player. The content pushing may be achieved by using a manifest file that associates content portions with smart poles.

For example, the vehicle utilizes a manifest with information about the poles (e.g., ID) and locations of the poles along a traveling path of the vehicle. The location may include the longitude and/or latitude of the pole. The vehicle utilizes such information to identify and determine how far it is to the smart pole. In response to approaching the identified smart pole, the vehicle establishes a session with the smart pole and makes a request for the content (e.g., using the content ID in the manifest that it received). The vehicle reports to the steering service the number of segments and/or amount of content received from the smart pole so that the steering service can coordinate the delivery of content from the next pole along the route (i.e., a second part of the content item, or the like).

In an embodiment, the client device operates in fill mode and issues a burst download request to a smart pole. For example, the client device retrieves as much content as possible in a relatively short period of time, e.g., a time that a vehicle is within a reliable transmission range of the smart pole.

In some embodiments, systems and processes include at least one of streaming and/or archiving via CDN, configuring in advance SSDs with VOD content, switching to SSD streaming, uploading via an SSD network, utilizing efficient data transfer protocols, segmenting and/or downloading files, utilizing real-time geo-location and/or V2I communication, utilizing hybrid architecture, utilizing drone-based content delivery, navigating a drone, transferring content via a drone, transferring content between SSD networks via drone, combinations of the same, or the like.

For example, a CDN streams live content and archives live content to SSD devices. The CDN provides VOD streaming, supports gaming services, and facilitates data exchange for vehicles. The CDN adapts bitrate and quality based on real-time traffic density and client demand to ensure uninterrupted high-quality content delivery along vehicle routes. Also, for example, the CDN configures in advance SSDs with (e.g., VOD) content based on predictive analysis of client requests, locations, and expected traffic, ensuring optimal content availability and efficient network usage. Further, for example, one or more clients seamlessly switch from mobile to high-quality SDD streaming upon nearing an SSD network, enhancing content quality and reducing mobile data usage. In addition, for example, the system enables clients to upload large data files sequentially via multiple SSD nodes while in transit, ensuring complete and efficient data transfer to the central distribution center. Moreover, for example, advanced protocols are utilized. The advanced protocols include IBM Aspera, FASP, HTTP/2, QUIC, and WebRTC. The advanced protocols ensure high-speed, secure file transfers between SSDs and clients during transit. Furthermore, for example, the system segments files for sequential download from multiple SSD nodes, ensuring continuous access to high-quality content without overloading any single mode. Additionally, for example, the system uses real-time geo-location and V2I communication with OAuth 2.0 for seamless pre-authorization and vehicle identification, ensuring secure and precise content delivery. Still further, for example, an architecture for buffering and broadcasting files utilizes a CDN with strategically placed SSDs and advanced data transfer protocols. The architecture dynamically generates manifest files based on navigation routes and enables autonomous vehicles to adjust speed for optimal content retrieval, ensuring continuous, high-quality content delivery.

In some embodiments, drones are combined with a CDN/SSD network. For example, for drone-based content delivery, one or more drones follow one or more vehicles to stream and/or transfer high-quality content directly to one or more in-car devices, providing uninterrupted content delivery. Also, for example, client geo-location and route data are provided for drone navigation. Drones use real-time geo-location and route data for precise navigation and landing, enabling accurate content exchange with moving vehicles. Further, for example, drone-based content transfer to and/or from vehicles is provided. Drones can adjust speed and/or route to download and/or upload content from vehicles, ensuring content delivery even with limited SSD access points. In addition, for example, drone-based content transfer between SSD networks is provided. Drones transfer content between SSD networks using both physical memory sticks and wireless communication, ensuring efficient content distribution even in the absence of stable connection.

For example, a system enhances in-car entertainment by providing uninterrupted, high-quality VOD streaming, live content, gaming services, and data exchange. Also, for example, based on requests for VOD, live content, or gaming services, the system processes these requests by accessing content servers, managing data streams, and optimizing network resources. The system is configured for a large user base, e.g., including frequent travelers, commuters, and families on long trips.

For example, the system dynamically adapts to traffic density, client demand, and coverage conditions to ensure efficient content delivery. Also, for example, based on input of real-time data on traffic density, client demand, and network coverage, the system adjusts content delivery strategies. As a result, consistent and efficient content delivery is provided in high-traffic areas and/or regions with poor network connectivity. Scalability is provided for various environments, from urban settings to remote areas.

For example, the system integrates advanced technologies such as 5G, Wi-Fi 6, V2I communication, and peer-to-peer protocols. Also, for example, the system processes data from 5G, Wi-Fi 6 networks, V2I communication channels, and peer-to-peer connections to optimize connectivity and content delivery.

For example, the system optimizes content delivery through pre-configured SSDs, adaptive bitrate streaming, and drone-based transfers. Also, for example, based on content requests and an assessment of network conditions, the system utilizes pre-configured SSDs for faster access, adjusts bitrates based on the network conditions, and employs SSD networks for data transfers in areas with limited connectivity. Drones may supplement the SSD networks. The system reduces strain on traditional network infrastructures and lowers operational costs for service providers.

For example, the system meets growing demand for high-quality mobile entertainment and seamless connectivity in the automotive industry. The system is configured to facilitate strategic partnerships between automotive companies, tech firms, and/or telecommunication providers.

For example, the system collects and analyzes real-time geo-location, route data, and client preferences. Also, for example, based on real-time data from users' devices and vehicles, the system utilizes analytics tools to process data and generate information useful to content distributors.

For example, the system utilizes secure data transfer protocols and advanced authentication methods. Also, for example, based on data transfer requests and authentication attempts, the system verifies and secures data transfers using encryption and authentication protocols. As a result, reliable and secure data transfers are provided, which address consumer concerns about data privacy and security, boost consumer confidence, and drive adoption.

For example, the system utilizes one or more drones for content delivery and data exchange, especially in areas with limited connectivity. Also, for example, based on content delivery requests and connectivity data, the system deploys one or more drones to deliver content and exchange data in areas with poor connectivity. As a result, enhanced mobile connectivity is achieved.

For example, the system is configured for compliance with one or more regulatory requirements for V2I infrastructure communication and data privacy. Also, for example, the regulatory requirements include controlled collection of real-time geo-location and route data. Further, for example, the system is fully scalable and adaptable.

Referring now to FIG. 1, an exemplary embodiment of the present invention is illustrated as a schematic diagram depicting an advanced content delivery system 100 designed for vehicles. One or more clients 110 engage with the system 100. For example, the system 100 comprises one or more client devices 120 located within the vehicle environment, which may include but are not limited to mobile phones and in-car entertainment systems such as displays and/or audio systems capable of presenting multimedia content to occupants. Also, for example, the client devices 120 are connected via a network interface that enables communication with one or more CDNs 140. The one or more CDNs 140 are employed to optimize the delivery speed and reliability of content. Further, for example, the CDNs 140 are connected via the internet 142 to one or more content sources 144. In addition, for example, the client devices 120 are connected via a network interface that enables communication with a cloud service 150. Moreover, for example, the cloud service 150 acts as an intermediary platform that provides access to content from one or more CDNs 140.

Additionally, for example, one or more SSDs designated as SSD1 (132), SSD2 (134), and SSDx (136) are depicted as part of the storage solution within this ecosystem. The one or more SSDs serve as local caches or storage points that can store frequently accessed or pre-fetched content from at least one of the one or more CDNs 140, the cloud service 150, or the like, thereby reducing latency and dependency on real-time streaming under varying network conditions.

Furthermore, for example, the system 100 integrates with a V2I communication system 160. The V2I communication system 160 is configured for additional data exchange between vehicles and road infrastructure, enabling enhanced functionalities such as real-time traffic updates, road conditions alerts, or other pertinent information beneficial for both navigation purposes and enriched media consumption experiences. The V2I communication system 160 is connectible with one or more vehicles (not shown).

A system 200 of FIG. 2 is similar to the system 100 of FIG. 1. Features having the same last two digits in common have, for example, like functionality. Duplicative descriptions are omitted for brevity. In addition to what is shown in FIG. 1, the system 200 includes, for example, a drone (e.g., directly, wirelessly, and/or operatively) connected to at least one of client devices SSDs 230, CDN 240, a vehicle 290, or the like.

FIG. 3 is a flow diagram of an example process 300 for the example system 100 of FIG. 1, in accordance with some embodiments of the disclosure. FIG. 4 is a flow diagram of an example process 400 for the example system 300 of FIG. 2, in accordance with some embodiments of the disclosure.

As detailed herein, in one or more embodiments, either alone or in combination, at least one of the following features is provided: CDN streaming (e.g., at 310), enhanced VOD streaming (e.g., at 310), enhanced (e.g., gaming) services (e.g., at 310), data exchange for vehicles, prewarming SSDs (e.g., with VOD content) (e.g., at 320), switching from mobile to SSD streaming (e.g., at 330), uploading content via an SSD network (e.g., at 340), utilizing one or more efficient data transfer protocols (e.g., at 350), segmenting files (e.g., at 360), sequentially downloading (e.g., segmented) files (e.g., at 360), real-time geolocation (e.g., at 370), pre-authorization (e.g., at 370), data navigation (e.g., at 370), identification (e.g., via V2I communication) (e.g., at 370), utilizing a hybrid architecture (e.g., at 380), buffering files (e.g., at 380), providing (e.g., broadcasting) (e.g., buffered) files (e.g., at 380), drone-based content delivery (e.g., at 410), client geo-location (e.g., at 420), route data for drone navigation (e.g., at 420), drone-based content transfer to and/or from one or more vehicles (e.g., at 430), drone-based content transfer between one or more SSD networks (e.g., at 440), combinations of the same, or the like.

In some embodiments, CDN streaming and (e.g., enhanced) VOD streaming, gaming services, and data exchange for vehicles are provided (see, e.g., FIG. 3, 310 herein). In one embodiment, a CDN streams live content and archives the content to specific SSDs based on a number of vehicles receiving content. The system also provides VOD streaming, gaming services, and data exchange for vehicles moving through an SSD network using wireless communication protocols like 5G or Wi-Fi for uninterrupted content delivery. Popular live content, such as a sports game, is streamed and is archived to strategically placed SSDs along a route.

A process for CDN streaming and VOD streaming, gaming services, and data exchange for vehicles is provided including at least one of receiving a content request, streaming, archiving, receiving content, adapting bitrate, adapting quality, buffering at a client, uploading content, transferring data, combinations of the same, or the like. For example, the process comprises a driver and/or a passenger requesting high-quality content via one or more in-car entertainment systems and/or client devices (e.g., tablets, smartphones, or the like). Also, for example, a CDN streams live content and/or archives the content in real time for one or more SSDs located along vehicle routes. Further, for example, as a vehicle passes an SSD, a client device connects to the SSD and downloads a high-quality content segment (e.g., with a slight delay). In addition, for example, the vehicle receives a first 10 minutes of a live sporting match at a first SSD, then a next 10 minutes at a second SSD, and so on. Moreover, for example, bitrate and/or quality of streamed content is adapted based on, e.g., a number of clients, traffic density, and/or available SSD devices. Furthermore, for example, in areas with fewer SSDs and/or more clients, the bitrate is reduced to simultaneously ensure fast content downloading for multiple users. Additionally, for example, the client device buffers and/or continuously plays the content in the highest possible quality (e.g., with some delay). Still further, for example, as a vehicle approaches a node of the SSD network, the SSD network wirelessly uploads the requested content directly to the device. Even further, for example, if a vehicle is moving at a relatively high speed and there is a large amount of data, the content is divided into packets and transmitted from multiple SSD nodes along the vehicle's route to ensure uninterrupted delivery.

In some embodiments, one or more SSDs are configured in advance with (e.g., VOD) content (see, e.g., FIG. 3, 320 herein). In one embodiment, a CDN pre-warms SSDs with VOD content based on an analysis of client requests (e.g., via in-car entertainment systems or client devices such as tablets and smartphones), client locations, expected client numbers with similar content requests, mobile or satellite coverage, and vehicle speeds. For example, the process of configuring one or more SSDs in advance with (e.g., VOD) content includes at least one of data analysis, strategic placement, configuring of content in advance, efficient utilization, combinations of the same, or the like.

For example, the CDN collects and analyzes data on client requests, client locations, expected client numbers, mobile or satellite coverage, and vehicle speeds. For instance, the CDN predicts high demand for recent matches of teams participating in an upcoming sports event in a city.

Also, for example, SSD networks are strategically placed in locations that maximize efficiency. For example, SSD nodes' download and/or upload bandwidth utilization is targeted at about 80 to about 90%. If usage exceeds about 90%, new nodes are added. If usage falls below about 80%, various methods are employed to increase efficiency.

Further, for example, the CDN pre-warms SSDs with relevant VOD content based on the analysis. If client data indicates an upcoming sports event, the CDN configures in advance SSDs with the teams' recent matches. For upcoming presidential debates, the CDN loads SSDs with previous debates and related content.

In addition, for example, to maintain efficiency, methods, such as using drones or increasing services that use the SSD network, are employed.

In some embodiments, streaming is switched from mobile to SSD streaming (see, e.g., FIG. 3, 330 herein). In one embodiment, one or more clients switch from mobile to SSD streaming to improve content quality. For example, using a mobile connection, a client watches low-quality live content, such as a World Cup match. Also, for example, upon stopping the vehicle near an SSD network, the client switches to SSD streaming. Further, for example, the content quality is improved as the client downloads and buffers high-quality segments from the SSD network.

In some embodiments, content is uploaded via an SSD network (see, e.g., FIG. 3, 340 herein). In one embodiment, the client uploads content, such as videos or software, to a central distribution center via an SSD network. For example, the client initiates an upload request on a client device. Also, for example, as the client passes multiple SSDs, the device connects to each SSD sequentially. Further, for example, the client uploads additional content (e.g., video footage of an accident (involving the vehicle, or near the vehicle), images, vehicle data related to emissions, or the like) to the SSD network. In addition, for example, the SSD network forwards the uploaded content to the central distribution center, ensuring complete transfer.

In some embodiments, efficient data transfer protocols are utilized (see, e.g., FIG. 3, 350 herein). Content distribution between SSDs uses efficient data transfer protocols to ensure high-speed, secure file transfers. For example, protocols such as IBM Aspera, FASP, SFTP, or SCP are used for content distribution between SSDs and/or between a CDN and SSDs. These protocols ensure high-speed, secure file transfers regardless of file size, transfer distance, or network conditions. Also, for example, protocols like Wi-Fi 6, HTTP/2, QUIC, or WebRTC maximize the speed of content download or upload during the client device's passage through an SSD's stable reception area. Further, for example, protocols are utilized to provide low latency, high-speed data transfer, and improved reliability for real-time communication.

In some embodiments, file segmentation and/or sequential download are provided (see, e.g., FIG. 3, 360 herein). File segmentation controls cases where clients cannot immediately download or upload the required content. For example, content is divided into manageable segments. Also, for example, if a vehicle cannot download an entire video from one SSD, it downloads the first segment and then continues downloading subsequent segments from the next SSDs along its route. Further, for example, if a vehicle cannot download an entire video from one SSD, it downloads subsequent segments from the next SSDs along its route. In addition, for example, the client device downloads and/or uploads these segments sequentially from and/or to multiple SSD nodes, ensuring continuous access to high-quality content without overloading a single SSD.

In some embodiments, real-time geolocation, pre-authorization, data navigation, and identification via V2I communication are provided (see, e.g., FIG. 3, 370 herein). After ordering the content delivery service, the client's real-time geolocation, route data, vehicle model, color, and license plate number are uploaded to a cloud service. The system uses protocols like OAuth 2.0 and V2I communication for identification and authorization. For example, the client's real-time geolocation, route data, vehicle model, color, and license plate number are uploaded to the cloud service. Also, for example, the system prepares by transferring the data to the nearest SSD node along the client's route. Further, for example, the SSD network uses these details to identify and/or authorize the vehicle as it approaches. In addition, for example, the system prepares in advance by transferring the data to the nearest SSD node along the client's route and ensuring readiness for data transfer. Moreover, for example, the system uses the coordinates for navigation to download, upload, or stream content to and/or from a vehicle. Furthermore, for example, the system activates cameras and computer vision algorithms to precisely identify the client's vehicle and exchange data with it. Furthermore, for example, when a vehicle nears an SSD node, cameras scan the area and identify it based on its model, color, and license plate number. The visual identification and transmitted unique identification data ensure precise verification. Additionally, for example, once verified, the SSD node initiates the data transfer, ensuring the correct content is delivered to the authorized vehicle. Still further, for example, this process comprises the client's device establishing a secure connection and obtaining authorization tokens using mobile connectivity, reducing the time needed for authentication when the client enters the SSD network. Even further, for example, upon nearing an SSD, the client's device establishes a secure connection using Transport Layer Security (TLS) and uses pre-obtained authorization tokens to quickly access the SSD's services, minimizing delay in content transfer. Yet further, for example, when a vehicle approaches a node of the SSD, identification occurs during a handshake phase. Further still, for example, identification occurs as part of a (e.g., content) request. Again, for example, a streaming session ID is associated with the vehicle, the streaming session ID is known to the node (e.g., via the steering service), and the steering service coordinates between the vehicle and the node of the SSD.

In some embodiments, a hybrid architecture is provided for buffering and providing (e.g., broadcasting) files using a CDN with strategically placed SSDs and advanced data transfer protocols to ensure continuous, high-quality content delivery (see, e.g., FIG. 3, 380 herein). For example, the CDN publishes content to the SSDs in one format (e.g., constant bitrate). Also, for example, the switching is signaled in a manifest file. Further, for example, a manifest file is generated for a player session based on its navigation route, including the locations of the SSDs from which a client might receive content. In addition, for example, the playback API service, in real time, instructs the client to receive content from an upcoming SSD by sending configuration data to initiate the data transfer phase (e.g., handshake between vehicle and SSD). Moreover, for example, an autonomous vehicle adjusts its speed based on information in the manifest file to retrieve the maximum number of segments from the SSD. Furthermore, for example, the player operates in a flexible or elastic buffer mode where it can buffer a large portion of content when streaming from SSDs.

In some embodiments, drone-based content delivery is provided (see, e.g., FIG. 4, 410 herein). In one embodiment, a system provides VOD streaming, gaming services, and data exchange for vehicles moving through a network of SSD nodes using drones for uninterrupted content delivery. For example, the user requests high-quality content via in-car entertainment systems or client devices (e.g., tablets, smartphones, or the like). Also, for example, as the vehicle approaches, the SSD node uploads the requested content to a drone.

In some embodiments, client geo-location and route data for drone navigation are provided (see, e.g., FIG. 4, 420 herein). In one embodiment, the client's real-time geo-location, route data, vehicle data, vehicle model, color, and license plate number are upload to a cloud service after ordering the content delivery service. Also, for example, the system prepares in advance by transferring the data to the nearest SSD node along the client's route and requesting a drone to retrieve and deliver the data. Further, for example, the drone receives the coordinates and uses them for rough navigation to download, upload, or stream content to and/or from a vehicle. In addition, for example, the drone activates cameras and computer vision algorithms for precise identification and landing to exchange memory sticks or data with the client's vehicle.

In some embodiments, drone-based content transfer to and/or from vehicles is provided (see, e.g., FIG. 4, 430 herein). In one embodiment, drones transmit and/or broadcast content to and/or from vehicles and SSDs while in motion. For example, the client initiates a drone transfer request. Also, for example, drones are controlled to adjust speed or slightly alter route to quickly download or upload content. This is useful if there are a limited number of SSD access points along a path of the vehicle. Further, for example, drones transfer content to and/or from vehicles. If many SSD devices are within the drone's range but not along the vehicle's path, the vehicle sends its drone to fly over the SSD network to download or upload content. In addition, for example, a service with its drones is used to download and/or upload content, ensuring content delivery even in challenging locations.

In some embodiments, drone-based content transfer between SSD networks is provided (see, e.g., FIG. 4, 440 herein). In one embodiment, when there is no stable connection between SSD nodes, between different SSD networks, or between SSDs and the CDN, drones transfer content between the CDN and SSD networks, between SSDs, or between different SSD networks. Drones perform content transfer by delivering memory sticks to and/or from SSDs or via wireless communication by flying over SSDs and reducing speed. For example, the CDN or SSD network initiates a drone transfer request when a stable connection is unavailable. Further, for example, the CDN uploads the content to a drone. In addition, for example, the drone transfers the content to the target SSD or another network. Moreover, for example, the drone delivers memory sticks to the SSD. Furthermore, for example, the drone adjusts speed and wirelessly transfers the content while flying over the SSD. Additionally, for example, once the content is delivered to one of the SSDs, the SSD distributes the content to other SSDs using peer-to-peer protocols.

In addition to SSDs for one or more SSD networks, other types of SSDs/SDNs are provided, either alone or in combination, as follows. Network-Attached Storage (NAS) is a device connected to a network that provides file-based data storage services to other devices on the network. Storage Area Network (SAN) is a high-speed network that connects storage devices to servers, providing block-level storage. Unified Storage combines NAS and SAN functionalities in a single device. Direct-Attached Storage (DAS) is storage directly connected to a computer or server (e.g., directly attached to a smart pole), not over a network. A Cloud Storage Gateway connects local storage to cloud storage services. Hyper-Converged Infrastructure (HCI) integrates compute, storage, and networking into a single system. Object Storage stores data as objects, often used in cloud storage solutions. Flash Storage uses flash memory to store data, known for high speed and reliability. Hybrid Storage combines traditional hard drives with flash storage to optimize performance and cost. Software-Defined Storage (SDS) uses software to manage storage hardware, providing flexibility and scalability.

Example Methods Performed by in-Vehicle Device

In some embodiments, as shown in FIG. 5, a method 500 for content delivery and data exchange in a vehicle 290 is provided. For example, the method 500 comprises utilizing a storage device network (SDN)/SSD 130/230. Also, for example, the SDN/SSD 130/230 comprises a plurality of nodes, and a content delivery network (CDN) 140/240. Further, for example, the method 500 is performed by an in-vehicle device 120/220 (e.g., in-car entertainment system, client device, or the like).

For example, the method 500 comprises causing streaming (e.g., at 310) of content from the CDN 140/240 to the vehicle 290. Also, for example, the method 500 comprises causing 505 to access a location of the vehicle 290 along a vehicle 290 path. Further, for example, the method 500 comprises causing 510 to access information regarding content availability from the CDN 140/240. In addition, for example, the method 500 comprises based at least in part on the location of the vehicle 290 along the vehicle 290 path, and the content availability from the CDN 140/240: causing 515 to determine an optimal node of the plurality of nodes of the SDN/SSD 130/230 along the vehicle 290 path for delivery of the content. Moreover, for example, the method 500 comprises based at least in part on the determining the optimal node of the SDN/SSD 130/230 along the vehicle 290 path for the delivery of the content: causing 520 to process (e.g., at 320) the content at the optimal node of the SDN/SSD 130/230 along the vehicle 290 path. Furthermore, for example, the method 500 comprises based at least in part on the determining the optimal node of the SDN/SSD 130/230 along the vehicle 290 path for the delivery of the content: causing 525 to switch (e.g., at 330) from streaming the content via the CDN 140/240 to streaming the content via the optimal node of the SDN/SSD 130/230 along the vehicle 290 path.

For example, the method 500 comprises receiving (e.g., at 311) a request for (e.g., high-quality) content. Also, for example, the method 500 comprises based at least in part on the request, transmitting (e.g., at 312) a request for (e.g., live) content to the CDN 140/240, which, in some instances, causes the CDN 140/240 to receive and archive (e.g., at 313) the (e.g., live) content in real-time at the SDN/SSD 130/230. Further, for example, the method 500 comprises receiving one or more content segments of the content from the SDN/SSD 130/230 (e.g., at 314-317).

For example, the content is video-on-demand content, and the causing to process (e.g., at 320) the content at the optimal node of the SDN/SSD 130/230 along the vehicle 290 path comprises: receiving (e.g., at 321) a request for content. Also, for example, the method 500 comprises based at least in part on the request, transmitting (e.g., at 322) at least one of geo-location information, route data, or client data to a cloud service 150/250, which, in some instances, causes: the cloud service 150/250 to analyze (e.g., at 323) the at least one of the geo-location information, the route data, or the client data. Further, for example, the method 500 comprises based at least in part on the analyzing the at least one of the geo-location information, the route data, or the client data: transmitting (e.g., at 324) the content from the CDN 140/240 to the SDN/SSD 130/230. In addition, for example, the method 500 comprises processing the content at the SDN/SSD 130/230. Moreover, for example, the method 500 comprises receiving (e.g., at 325) the processed content from the SDN/SSD 130/230.

For example, the content is live content, and the causing to switch (e.g., at 330) from streaming the content via the CDN 140/240 to streaming the content via the SDN/SSD 130/230 along the vehicle 290 path comprises: receiving (e.g., at 331) a request for (e.g., live) content via a (e.g., mobile) network. Also, for example, the method 500 comprises based at least in part on the request, transmitting (e.g., at 332) a request to stream the (e.g., low-quality) content to the CDN 140/240. Further, for example, the method 500 comprises receiving the stream of the content from the CDN 140/240. In addition, for example, the method 500 comprises based at least in part on detecting (e.g., at 333) the optimal node of the SDN/SSD 130/230 near the vehicle 290 (e.g., the vehicle 290 passes relatively near the SDN/SSD 130/230): switching (e.g., at 334) to streaming from the optimal node of the SDN/SSD 130/230. Moreover, for example, the method 500 comprises receiving (e.g., at 335) the (e.g., high quality) content from the optimal node of the SDN/SSD 130/230.

For example, the method 500 comprises receiving user selection of a trick-play option at the in-vehicle device 120/220. Also, for example, the method 500 comprises in response the receiving the user selection of the trick-play option at the in-vehicle device 120/220, performing the trick-play option.

For example, the method 500 comprises the in-vehicle device 120/220 uploading (e.g., at 340) additional content to the SDN/SSD 130/230. Also, for example, the method 500 comprises receiving (e.g., at 341) a user upload request. Further, for example, the method 500 comprises based at least in part on the user upload request, connecting (e.g., at 342) to the SDN/SSD 130/230. In addition, for example, the method 500 comprises uploading (e.g., at 343 and 344) a content segment of the additional content to the SDN/SSD 130/230, which, in some instances, causes the SDN/SSD 130/230 to provide (e.g., at 345) the uploaded content segment to the CDN 140/240. As used herein, in this context, providing content refers to at least one of forwarding, transmitting, relaying, making available (e.g., so that a CDN can fetch), or the like. Moreover, for example, the method 500 comprises receiving (e.g., at 346) a confirmation of completion of the uploading from the SDN/SSD 130/230.

For example, the method 500 comprises transmitting and receiving (e.g., at 350) the content via one or more (e.g., efficient) transfer protocols. Also, for example, the method 500 comprises receiving (e.g., at 351) a request for data transfer. In some instances, the request is automated, e.g., if a client device is connected and streaming content from the CDN, the steering service steers the client device by instructing the client device to request or fetch content from a node that the vehicle is approaching. In other instances, the request is a request, e.g., the user is requesting a trick play function via a client device. Further, for example, the method 500 comprises based at least in part on the request, connecting (e.g., at 352) to the CDN 140/240 and transferring (e.g., at 352) data to the CDN 140/240, which, in some instances, causes the CDN 140/240 to distribute (e.g., at 353) data using the one or more transfer protocols to the SDN/SSD 130/230. In addition, for example, the one or more transfer protocols comprise at least one of IBM Aspera, FASP, SFTP, or SCP. Moreover, for example, the method 500 comprises receiving (e.g., at 354) the data from the SDN/SSD 130/230 using one or more networking technologies including at least one of Wi-Fi 6, HTTP/2, QUIC, or WebRTC.

For example, the method 500 comprises segmenting (e.g., at 360) the content into files and sequentially downloading the segmented files. Also for example, the method 500 comprises receiving (e.g., at 361) a request for a "large" file, i.e., a file having a size greater than a predetermined threshold. Further, for example, the method 500 comprises based at least in part on the request, requesting sequential download (e.g., at 362) of a plurality of file segments from the SDN/SSD 130/230, wherein the file comprises the plurality of file segments. In addition, for example, the method 500 comprises file segmentation (e.g., at 363), including, e.g., requesting (e.g., at 364) each of the plurality of file segments from the SDN/SSD 130/230. In addition, for example, the method 500 comprises receiving (e.g., at 365) each of the plurality of file segments from the SDN/SSD 130/230 until the file is complete.

For example, the method 500 comprises accessing (e.g., at 370) one or more real-time geo-location, pre-authorization, data navigation, and identification services via vehicle 290-to-infrastructure (V2I) communication. Also, for example, the method 500 comprises receiving (e.g., at 371) a request for a content delivery service. Further, for example, the method 500 comprises based at least in part on the request, transmitting (e.g., uploading) (e.g., at 372) data, e.g., at least one of geo-location information, route data, or client data, to a cloud service 150/250. In addition, for example, the method 500 comprises transferring (e.g., at 373), from the cloud service 150/250, the data, e.g., the at least one of geo-location information, route data, or client data, to a nearest node of the SDN/SSD 130/230. Moreover, for example, the method 500 comprises authorizing (e.g., at 374), at the SDN/SSD 130/230, V2I communication with a V2I communication system. Furthermore, for example, the method 500 comprises receiving (e.g., at 375), at the SDN/SSD 130/230, vehicle identification data from the V2I communication system. Additionally, for example, the method 500 comprises identifying (e.g., at 376, which may include scanning using cameras or RFID sensors), at the SDN/SSD 130/230, the vehicle 290 via the V2I communication system. Still further, for example, the method 500 comprises verifying (e.g., at 377) the vehicle 290 at the SDN/SSD 130/230, e.g., verifying the car model, color, license plate, or the like. Even further, for example, the method 500 comprises initiating (e.g., at 378) data transfer from the SDN/SSD 130/230.

For example, the method 500 comprises buffering and/or providing (e.g., at 380) a manifest file. Also, for example, the method 500 comprises receiving (e.g., at 381) a request for content. Further, for example, the method 500 comprises based at least in part on the request, requesting (e.g., at 382) the content from the CDN 140/240, which, in some instances, causes the CDN 140/240 to publish (e.g., at 383) the content to the SDN/SSD 130/230. In addition, for example, the method 500 comprises receiving (e.g., at 384) the manifest file with one or more SDN/SSD 130/230 locations from the CDN 140/240, which, in some instances, causes the in-vehicle device 120/220 to request (e.g., fetch) (e.g., at 385) the content from the SDN/SSD 130/230. Moreover, for example, the method 500 comprises buffering (e.g., at 386) a "large" portion of the content, e.g., a portion of the content having a size greater than a predetermined threshold.

For example, the method 500 comprises based at least in part on the in-vehicle device 120/220 receiving (e.g., at 411) a request for the content, requesting (e.g., at 412), at the in-vehicle device 120/220, the content from the SDN/SSD 130/230. Also, for example, the method 500 comprises causing a drone 280 to receive (e.g., at 413) the content from the SDN/SSD 130/230. Further, for example, the method 500 comprises causing the drone 280 to navigate to a location of the vehicle 290. In addition, for example, the method 500 comprises causing the drone 280 to transmit (e.g., at 414) the content to the vehicle 290, which may include transferring the content via a USB device.

For example, the method 500 comprises based at least in part on the in-vehicle device 120/220 receiving (e.g., at 421) a request for the content (e.g., an order for a content delivery service), causing the in-vehicle device 120/220 to transmit (e.g., at 422) at least one of geo-location information, route information, or vehicle information to a cloud service 150/250. Also, for example, the method 500 comprises causing the SSD (e.g., at a nearest SSD node) to receive (e.g., at 423) the at least one of the geo-location information, the route information, or the vehicle information from the cloud service 150/250. Further, for example, the method 500 comprises causing a drone 280 to receive (e.g., at 424), from the SDN/SSD 130/230, information preparing the drone 280 for transmitting the content, which may include preparing the drone 280 for data retrieval. In addition, for example, the method 500 comprises causing the drone 280 to navigate (e.g., at 425) to a location of the vehicle 290. Moreover, for example, the method 500 comprises causing the drone 280 to identify (e.g., at 426) the vehicle 290, which may also include landing the drone 280 at or near the vehicle 290 (e.g., with the assistance of a camera and/or computer vision). Furthermore, for example, the method 500 comprises causing the drone 280 to transmit (e.g., at 427) the content to the vehicle 290 (e.g., via one or more memory sticks).

For example, the method 500 comprises receiving (e.g., at 431), at the in-vehicle device 120/220, a request for the content, which, in some instances, involves the user 210 initiating a drone transfer request. Also, for example, the method 500 comprises based at least in part on a drone 280 receiving (e.g., at 432) a request from the CDN 140/240 for transfer of the content via the drone 280, causing the drone 280 to navigate (e.g., at 433) to a location of the SDN/SSD 130/230, which may include the drone 280 adjusting a speed and/or a route for the content transfer.

In an alternative embodiment, when there are limited SSD access points (e.g., at 434), for example, the method 500 comprises, based at least in part on a drone 280 receiving a request for transfer of the content via the drone 280 from the vehicle 290, sending (e.g., at 435) the drone 280 to a node of the SDN/SSD 130/230, and causing the drone 280 to transmit and/or receive (e.g., upload and/or download) (e.g., at 436) the content to and/or from the SDN/SSD 130/230.

For example, the method 500 comprises causing a drone 280 to transfer (e.g., transmit and/or receive) (e.g., at 437) the content to and/or from the vehicle 290.

In an alternative embodiment, service drones are utilized (e.g., at 438). For example, the method 500 comprises causing a drone 280 to transmit and/or receive (e.g., at 439) the content to and/or from a web service (e.g., using one or more service drones for transfer).

For example, the method 500 comprises causing a drone 280 to receive (e.g., at 441), from the CDN 140/240, information to prepare the drone 280 for delivery of the content via the SDN/SSD 130/230 (e.g., the CDN 140/240 may initiate at a transfer request). Also, for example, the method 500 comprises causing the drone 280 to receive (e.g., at 442) the content from the CDN 140/240. Further, for example, the method 500 comprises causing the drone 280 to transmit (e.g., transfer) (e.g., at 443) the content to the SDN/SSD 130/230.

In an alternative embodiment, content delivery utilizes one or more memory devices, such as memory sticks (e.g., at 444). For example, the method 500 comprises causing the drone 280 to deliver (e.g., at 445) the content to the SDN/SSD 130/230 via one or more memory devices (e.g., memory sticks).

For example, content may be transferred wirelessly (e.g., at 446). Also, for example, the method 500 comprises causing the drone 280 to navigate (e.g., at 447) to a location of the SDN/SSD 130/230. Further, for example, the method 500 comprises causing the drone 280 to transmit (e.g., at 447) the content wirelessly to the SDN/SSD 130/230, which may involve the drone 280 reducing a speed for the transfer.

For example, the method 500 comprises causing the SDN/SSD 130/230 to transmit (e.g., at 448) the content from one node of the SDN/SSD 130/230 to another node of the SDN/SSD 130/230 utilizing one or more peer-to-peer protocols.

Example Methods Performed by SDN

In some embodiments, as shown in FIG. 6, a method 600 for content delivery and data exchange in a vehicle 290 is provided utilizing an in-vehicle device 120/220 of the vehicle 290 and a content delivery network (CDN) 140/240. For example, the method 600 is performed by a storage device network (SDN/SSD 130/230), the SDN/SSD 130/230 comprising a plurality of nodes.

For example, the method 600 comprises causing streaming (e.g., at 310) of content from the CDN 140/240 to the vehicle 290. Also, for example, the method 600 comprises based at least in part on the in-vehicle device 120/220 accessing a location of the vehicle 290 along a vehicle 290 path: requesting 605 information regarding content availability from the CDN 140/240. Further, for example, the method 600 comprises based at least in part on of the location of the vehicle 290 along the vehicle 290 path, and the content availability from the CDN 140/240: determining 610 an optimal node of the plurality of nodes of the SDN/SSD 130/230 along the vehicle 290 path for delivery of the content. In addition, for example, the method 600 comprises based at least in part on the determining the optimal node of the SDN/SSD 130/230 along the vehicle 290 path for the delivery of the content: processing 615 (e.g., at 320) the content at the optimal node of the SDN/SSD 130/230 along the vehicle 290 path. Moreover, for example, the method 600 comprises switching 620 (e.g., at 330) from streaming the content via the CDN 140/240 to streaming content via the optimal node of the SDN/SSD 130/230 along the vehicle 290 path.

For example, the method 600 comprises based at least in part on the in-vehicle device 120/220 receiving (e.g., at 311) a request for content, causing the in-vehicle device 120/220 to transmit (e.g., at 312) a request for content to the CDN 140/240, which, in some instances, causes the SDN/SSD 130/230 to receive and archive (e.g., at 313) the content in real-time from the CDN 140/240. Also, for example, the method 600 comprises transmitting (e.g., at 314) a (e.g., high-quality) content segment from the SDN/SSD 130/230 to the in-vehicle device 120/220. Further, for example, the method 600 comprises receiving (e.g., at 316), from the in-vehicle device 120/220, a request for a next content segment via (e.g., high-speed) data transfer (e.g., at 315). In addition, for example, the method 600 comprises transmitting (e.g., at 317) a next high-quality content segment from the SDN/SSD 130/230 to the in-vehicle device 120/220.

For example, the content is video-on-demand content, and the processing (e.g., at 320) the content at the optimal node of the SDN/SSD 130/230 along the vehicle 290 path comprises: based at least in part on the in-vehicle device 120/220 receiving (e.g., at 321) a request for content, causing the in-vehicle device 120/220 to transmit (e.g., at 322) at least one of geo-location information, route data, or client data to a cloud service 150/250, which, in some instances, causes: the cloud service 150/250 to analyze (e.g., at 323) the at least one of the geo-location information, the route data, or the client data. Also, for example, the method 600 comprises based at least in part on the analyzing the at least one of the geo-location information, the route data, or the client data: receiving (e.g., at 324) the content at the SDN/SSD 130/230 from the CDN 140/240. Further, for example, the method 600 comprises processing the content at the SDN/SSD 130/230. In addition, for example, the method 600 comprises transmitting (e.g., at 325) to the in-vehicle device 120/220 the processed content from the SDN/SSD 130/230.

For example, the content is live content, and the switching (e.g., at 330) from streaming the content via the CDN 140/240 to streaming the content via the SDN/SSD 130/230 along the vehicle 290 path comprises: based at least in part on the in-vehicle device 120/220 receiving (e.g., at 331) a request for content via a mobile network, causing the in-vehicle device 120/220 to transmit (e.g., at 332) a request to stream the content to the CDN 140/240. Also, for example, the method 600 comprises receiving, at the SDN/SSD 130/230, the stream of the content from the CDN 140/240. Further, for example, the method 600 comprises based at least in part on detecting (e.g., at 333) the optimal node of the SDN/SSD 130/230 near the vehicle 290: switching (e.g., at 334) to streaming from the optimal node of the SDN/SSD 130/230. Further, for example, the method 600 comprises receiving (e.g., at 335) the content from the optimal node of the SDN/SSD 130/230.

For example, the method 600 comprises causing the in-vehicle device 120/220 to receive user selection of a trick-play option at the in-vehicle device 120/220. Also, for example, the method 600 comprises in response the in-vehicle device 120/220 receiving the user selection of the trick-play option at the in-vehicle device 120/220, causing the in-vehicle device 120/220 to perform the trick-play option.

For example, the method 600 comprises receiving (e.g., at 340) additional content from the in-vehicle device 120/220 via the SDN/SSD 130/230. Also, for example, the method 600 comprises based at least in part on the in-vehicle device 120/220 receiving (e.g., at 341) a user transmit request, and based at least in part on the user transmit request, connecting the in-vehicle device 120/220 (e.g., at 342) to the SDN/SSD 130/230. Further, for example, the method 600 comprises receiving (e.g., at 343) a content segment of the additional content from the in-vehicle device 120/220. In addition, for example, the method 600 comprises forwarding (e.g., at 345) the transmitted content segment to the CDN 140/240. In addition, for example, the method 600 comprises transmitting (e.g., at 346) a confirmation of completion of the transmitting to the in-vehicle device 120/220.

For example, the method 600 comprises receiving and/or transmitting (e.g., at 350) the content via one or more transfer protocols at the SDN/SSD 130/230. Also, for example, the method 600 comprises based at least in part on the in-vehicle device 120/220 receiving (e.g., at 351) a request for data transfer, causing the in-vehicle device 120/220 to connect (e.g., at 352) to the CDN 140/240 and transfer data to the CDN 140/240. Further, for example, the method 600 comprises receiving (e.g., at 353) data from the CDN 140/240 at the SDN/SSD 130/230 using the one or more transfer protocols, wherein the one or more transfer protocols comprise at least one of IBM Aspera, FASP, SFTP, or SCP. In addition, for example, the method 600 comprises transmitting (e.g., at 354) from the SDN/SSD 130/230 to the in-vehicle device 120/220 the data using one or more networking technologies including at least one of Wi-Fi 6, HTTP/2, QUIC, or WebRTC.

For example, the method 600 comprises segmenting (e.g., at 360) the content into files and sequentially transmitting the segmented files to the in-vehicle device 120/220. Also, for example, the method 600 comprises based at least in part on the in-vehicle device 120/220 receiving (e.g., at 361) a request for a file having a size greater than a predetermined threshold, receiving at the SDN/SSD 130/230 from the in-vehicle device 120/220 a request for sequential download (e.g., at 362) of a plurality of file segments from the SDN/SSD 130/230, wherein the file comprises the plurality of file segments. Further, for example, the method 600 comprises receiving at the SDN/SSD 130/230 from the in-vehicle device 120/220 a request (e.g., at 364) for each of the plurality of file segments from the SDN/SSD 130/230. In addition, for example, the method 600 comprises transmitting from the SDN/SSD 130/230 to the in-vehicle device 120/220 (e.g., at 365) each of the plurality of file segments from the SDN/SSD 130/230 until the file is complete.

For example, the method 600 comprises accessing (e.g., at 370) one or more real-time geo-location, pre-authorization, data navigation, and identification services via vehicle 290-to-infrastructure (V2I) communication. Also, for example, the method 600 comprises based at least in part on the in-vehicle device 120/220 receiving (e.g., at 371) a request for a content delivery service, causing the in-vehicle device 120/220 to transmit (e.g., at 372) at least one of geo-location information, route data, or client data to a cloud service 150/250, which, in some instances, causes: receiving (e.g., at 373), from the cloud service 150/250, the at least one of geo-location information, route data, or client data at a nearest node of the SDN/SSD 130/230. Further, for example, the method 600 comprises transmitting an authorization (e.g., at 374) of V2I communication from the SDN/SSD 130/230 to a V2I communication system. In addition, for example, the method 600 comprises receiving (e.g., at 375), at the SDN/SSD 130/230, vehicle identification data from the V2I communication system. Moreover, for example, the method 600 comprises transmitting identifying information (e.g., at 376) of the vehicle 290 from the SDN/SSD 130/230 to the V2I communication system. Furthermore, for example, the method 600 comprises verifying (e.g., at 377) the vehicle 290 at the SDN/SSD 130/230. Additionally, for example, the method 600 comprises initiating (e.g., at 378) data transfer from the SDN/SSD 130/230 to the in-vehicle device 120/220.

For example, the method 600 comprises buffering and/or providing (e.g., at 380) a manifest file. Also, for example, the method 600 comprises based at least in part on the in-vehicle device 120/220 receiving (e.g., at 381) a request for content, causing the in-vehicle device 120/220 to request (e.g., at 382) the content from the CDN 140/240, which, in some instances, causes the CDN 140/240 to publish (e.g., at 383) the content to the SDN/SSD 130/230. Further, for example, the method 600 comprises causing the in-vehicle device 120/220 to receive (e.g., at 384) the manifest file with one or more SDN/SSD 130/230 locations from the CDN 140/240, which, in some instances, causes the in-vehicle device 120/220 to request (e.g., at 385) the content from the SDN/SSD 130/230. In addition, for example, the method 600 comprises causing the in-vehicle device 120/220 to buffer (e.g., at 386) a portion of the content having a size greater than a predetermined threshold.

For example, the method 600 comprises based at least in part on the in-vehicle device 120/220 receiving (e.g., at 411) a request for the content, causing the in-vehicle device 120/220 to request (e.g., at 412) the content from the SDN/SSD 130/230. Also, for example, the method 600 comprises receiving (e.g., at 412) the request at the SDN/SSD 130/230. Further, for example, the method 600 comprises transmitting (e.g., at 413), to a drone 280, the content from the SDN/SSD 130/230. In addition, for example, the method 600 comprises causing the drone 280 to navigate to a location of the vehicle 290. Moreover, for example, the method 600 comprises causing the drone 280 to transmit (e.g., at 414) the content to the vehicle 290.

For example, the method 600 comprises based at least in part on the in-vehicle device 120/220 receiving (e.g., at 421) a request for the content, causing the in-vehicle device 120/220 to transmit (e.g., at 422) at least one of geo-location information, route information, or vehicle information to a cloud service 150/250. Also, for example, the method 600 comprises receiving (e.g., at 423), at the SDN/SSD 130/230, the at least one of the geo-location information, the route information, or the vehicle information from the cloud service 150/250. Further, for example, the method 600 comprises transmitting (e.g., at 424), from the SDN/SSD 130/230 to a drone 280, information preparing the drone 280 for transmitting the content. In addition, for example, the method 600 comprises causing the drone 280 to navigate (e.g., at 425) to a location of the vehicle 290. Moreover, for example, the method 600 comprises causing the drone 280 to identify (e.g., at 426) the vehicle 290. Furthermore, for example, the method 600 comprises causing the drone 280 to transmit (e.g., at 427) the content to the vehicle 290.

For example, the method 600 comprises based at least in part on the in-vehicle device 120/220 receiving (e.g., at 431) a request for the content, and based at least in part on a drone 280 receiving (e.g., at 432) a request from the CDN 140/240 for transfer of the content via the drone 280, causing the drone 280 to navigate (e.g., at 433) to a location of the SDN/SSD 130/230.

For example, the method 600 comprises based at least in part on a drone 280 receiving (e.g., at 435) a request for transfer of the content via the drone 280 from the vehicle 290, transmitting and/or receiving (e.g., at 436) the content from the drone 280 to and/or from the SDN/SSD 130/230.

For example, the method 600 comprises causing a drone 280 to transmit and/or receive (e.g., at 437) the content to and/or from the vehicle 290.

For example, the method 600 comprises causing a drone 280 to transmit and/or receive (e.g., at 439) the content to and/or from a web service.

For example, the method 600 comprises causing a drone 280 to receive (e.g., at 441), from the CDN 140/240, information to prepare the drone 280 for delivery of the content via the SDN/SSD 130/230. Also, for example, the method 600 comprises causing the drone 280 to receive (e.g., at 442) the content from the CDN 140/240. Further, for example, the method 600 comprises causing the drone 280 to transmit (e.g., at 443) the content to the SDN/SSD 130/230. In addition, for example, the method 600 comprises receiving (e.g., at 443) the content from the drone 280 at the SDN/SSD 130/230.

For example, the method 600 comprises causing the drone 280 to deliver (e.g., at 445) the content to the SDN/SSD 130/230 via one or more memory devices. Also, for example, the method 600 comprises receiving (e.g., at 445) the content from the drone 280 at the SDN/SSD 130/230 via the one or more memory devices.

For example, the method 600 comprises causing the drone 280 to navigate (e.g., at 447) to a location of the SDN/SSD 130/230. Also, for example, the method 600 comprises causing the drone 280 to transmit (e.g., at 447) the content wirelessly to the SDN/SSD 130/230. Further, for example, the method 600 comprises receiving (e.g., at 447) the content wirelessly from the drone 280 at the SDN/SSD 130/230.

For example, the method 600 comprises transmitting (e.g., at 448) the content from one node of the SDN/SSD 130/230 to another node of the SDN/SSD 130/230 utilizing a peer-to-peer protocol.

Example Methods Performed by CDN

In some embodiments, as shown in FIG. 7, a method 700 for live content delivery and data exchange in a vehicle 290 utilizing a storage device network (SDN/SSD 130/230), the SDN/SSD 130/230 comprising a plurality of nodes, and an in-vehicle device 120/220. For example, the method 700 is performed by a content delivery network (CDN) 140/240.

For example, the method 700 comprises streaming (e.g., at 310) of live content from the CDN 140/240 to the vehicle 290. Also, for example, the method 700 comprises based at least in part on the in-vehicle device 120/220 accessing a location of the vehicle 290 along a vehicle 290 path, and based at least in part on the in-vehicle device 120/220 requesting information regarding live content availability from the CDN 140/240: determining 705, at the CDN 140/240, an optimal node of the plurality of nodes of the SDN/SSD 130/230 along the vehicle 290 path for delivery of the live content. Further, for example, the method 700 comprises based at least in part on the determining, at the CDN 140/240, the optimal node of the SDN/SSD 130/230 along the vehicle 290 path for the delivery of the live content: causing 710 to process (e.g., at 320) the live content at the optimal node of the SDN/SSD 130/230 along the vehicle 290 path. In addition, for example, the method 700 comprises switching 715 (e.g., at 330) from streaming the live content via the CDN 140/240 and causing to stream the live content via the optimal node of the SDN/SSD 130/230 along the vehicle 290 path.

For example, the method 700 comprises based at least in part on the in-vehicle device 120/220 receiving (e.g., at 311) a request for live content, causing the in-vehicle device 120/220 to transmit (e.g., at 312) a request for live content to the CDN 140/240. Also, for example, the method 700 comprises receiving, at the CDN 140/240, the request for live content from the in-vehicle device 120/220, which, in some instances, causes the SDN/SSD 130/230 to receive and archive (e.g., at 313) the live content in real-time from the CDN 140/240. Further, for example, the method 700 comprises transmitting (e.g., at 314) a high-quality live content segment from the SDN/SSD 130/230 to the in-vehicle device 120/220. In addition, for example, the method 700 comprises receiving (e.g., at 316), from the in-vehicle device 120/220, a request for a next live content segment via (e.g., high-speed) data transfer (e.g., at 315). Moreover, for example, the method 700 comprises transmitting (e.g., at 317) a next (e.g., high-quality) live content segment from the SDN/SSD 130/230 to the in-vehicle device 120/220.

For example, the processing (e.g., at 320) the live content at the optimal node of the SDN/SSD 130/230 along the vehicle 290 path comprises: based at least in part on the in-vehicle device 120/220 receiving (e.g., at 321) a request for live (e.g., VOD) content, causing the in-vehicle device 120/220 to transmit (e.g., at 322) at least one of geo-location information, route data, or client data to a cloud service 150/250, which, in some instances, causes: the cloud service 150/250 to analyze (e.g., at 323) the at least one of the geo-location information, the route data, or the client data. Also, for example, the method 700 comprises based at least in part on the analyzing the at least one of the geo-location information, the route data, or the client data: receiving (e.g., at 324) the live (e.g. VOD) content at the SDN/SSD 130/230 from the CDN 140/240. Further, for example, the method 700 comprises processing the live content at the SDN/SSD 130/230. In addition, for example, the method 700 comprises transmitting (e.g., at 325) to the in-vehicle device 120/220 the processed live (e.g., VOD) content from the SDN/SSD 130/230.

For example, the switching (e.g., at 330) from streaming the live content via the CDN 140/240 to streaming the live content via the SDN/SSD 130/230 along the vehicle 290 path comprises: based at least in part on the in-vehicle device 120/220 receiving (e.g., at 331) a request for live content via a mobile network, causing the in-vehicle device 120/220 to transmit (e.g., at 332) a request to stream the live content to the CDN 140/240. Also, for example, the method 700 comprises receiving, at the SDN/SSD 130/230, the stream of the live content from the CDN 140/240. Further, for example, the method 700 comprises based at least in part on detecting (e.g., at 333) the optimal node of the SDN/SSD 130/230 near the vehicle 290: switching (e.g., at 334) to streaming from the optimal node of the SDN/SSD 130/230. In addition, for example, the method 700 comprises receiving (e.g., at 335) the live content from the optimal node of the SDN/SSD 130/230.

For example, the method 700 comprises causing the in-vehicle device 120/220 to receive user selection of a trick-play option at the in-vehicle device 120/220. Also, for example, the method 700 comprises in response the in-vehicle device 120/220 receiving the user selection of the trick-play option at the in-vehicle device 120/220, causing the in-vehicle device 120/220 to perform the trick-play option.

For example, the method 700 comprises receiving (e.g., at 340) additional content from the in-vehicle device 120/220 via the SDN/SSD 130/230. Also, for example, the method 700 comprises based at least in part on the in-vehicle device 120/220 receiving (e.g., at 341) a user transmit request, and based at least in part on the user transmit request, connecting the in-vehicle device 120/220 (e.g., at 342) to the SDN/SSD 130/230. Further, for example, the method 700 comprises receiving (e.g., at 343) a content segment of the additional content from the in-vehicle device 120/220. In addition, for example, the method 700 comprises forwarding (e.g., at 345) the transmitted content segment to the CDN 140/240. Moreover, for example, the method 700 comprises transmitting (e.g., at 346) a confirmation of completion of the transmitting to the in-vehicle device 120/220.

For example, the method 700 comprises receiving and/or transmitting (e.g., at 350) the live content via one or more transfer protocols at the SDN/SSD 130/230. Also, for example, the method 700 comprises based at least in part on the in-vehicle device 120/220 receiving (e.g., at 351) a request for data transfer, causing the in-vehicle device 120/220 to connect (e.g., at 352) to the CDN 140/240 and transfer data to the CDN 140/240. Further, for example, the method 700 comprises receiving (e.g., at 353) data from the CDN 140/240 at the SDN/SSD 130/230 using the one or more transfer protocols, wherein the one or more transfer protocols comprise at least one of IBM Aspera, FASP, Secure File Transfer Protocol (SFTP), or Secure Copy Protocol (SCP). In addition, for example, the method 700 comprises transmitting (e.g., at 354) from the SDN/SSD 130/230 to the in-vehicle device 120/220 the data using one or more networking technologies including at least one of Wi-Fi 6, HTTP/2, QUIC, or WebRTC.

For example, the method 700 comprises segmenting (e.g., at 360) the live content into files and sequentially transmitting the segmented files to the in-vehicle device 120/220. Also, for example, the method 700 comprises based at least in part on the in-vehicle device 120/220 receiving (e.g., at 361) a request for a file having a size greater than a predetermined threshold, receiving at the SDN/SSD 130/230 from the in-vehicle device 120/220 a request for sequential download (e.g., at 362) of a plurality of file segments from the SDN/SSD 130/230, wherein the file comprises the plurality of file segments. Further, for example, the method 700 comprises receiving at the SDN/SSD 130/230 from the in-vehicle device 120/220 a request (e.g., at 364) for each of the plurality of file segments from the SDN/SSD 130/230. In addition, for example, the method 700 comprises transmitting from the SDN/SSD 130/230 to the in-vehicle device 120/220 (e.g., at 365) each of the plurality of file segments from the SDN/SSD 130/230 until the file is complete.

For example, the method 700 comprises accessing (e.g., at 370) one or more real-time geo-location, pre-authorization, data navigation, and identification services via vehicle 290-to-infrastructure (V2I) communication. Also, for example, the method 700 comprises based at least in part on the in-vehicle device 120/220 receiving (e.g., at 371) a request for a content delivery service, causing the in-vehicle device 120/220 to transmit (e.g., at 372) at least one of geo-location information, route data, or client data to a cloud service 150/250, which, in some instances, causes: receiving (e.g., at 373), from the cloud service 150/250, the at least one of geo-location information, route data, or client data at a nearest node of the SDN/SSD 130/230. Further, for example, the method 700 comprises transmitting an authorization (e.g., at 374) of V2I communication from the SDN/SSD 130/230 to a V2I communication system. In addition, for example, the method 700 comprises receiving (e.g., at 375), at the SDN/SSD 130/230, vehicle identification data from the V2I communication system. Moreover, for example, the method 700 comprises transmitting identifying information (e.g., at 376) of the vehicle 290 from the SDN/SSD 130/230 to the V2I communication system. Furthermore, for example, the method 700 comprises verifying (e.g., at 377) the vehicle 290 at the SDN/SSD 130/230. Additionally, for example, the method 700 comprises initiating (e.g., at 378) data transfer from the SDN/SSD 130/230 to the in-vehicle device 120/220.

For example, the method 700 comprises buffering and/or providing (e.g., at 380) a manifest file. Also, for example, the method 700 comprises based at least in part on the in-vehicle device 120/220 receiving (e.g., at 381) a request for live content, causing the in-vehicle device 120/220 to request (e.g., at 382) the live content from the CDN 140/240. Further, for example, the method 700 comprises publishing (e.g., at 383), at the CDN 140/240, the live content to the SDN/SSD 130/230. In addition, for example, the method 700 comprises causing the in-vehicle device 120/220 to receive (e.g., at 384) the manifest file with one or more SDN/SSD 130/230 locations from the CDN 140/240, which, in some instances, causes the in-vehicle device 120/220 to request (e.g., at 385) the live content from the SDN/SSD 130/230. Moreover, for example, the method 700 comprises causing the in-vehicle device 120/220 to buffer and/or cache (e.g., at 386) a portion of the live content having a size greater than a predetermined threshold.

For example, the method 700 comprises based at least in part on the in-vehicle device 120/220 receiving (e.g., at 411) a request for the live content, causing the in-vehicle device 120/220 to request (e.g., at 412) the live content from the SDN/SSD 130/230. Also, for example, the method 700 comprises causing the SDN/SSD 130/230 to receive (e.g., at 412) the request. Further, for example, the method 700 comprises causing the SDN/SSD 130/230 to transmit (e.g., at 413), to a drone 280, the live content. In addition, for example, the method 700 comprises causing the drone 280 to navigate to a location of the vehicle 290. Moreover, for example, the method 700 comprises causing the drone 280 to transmit (e.g., at 414) the live content to the vehicle 290.

For example, the method 700 comprises based at least in part on the in-vehicle device 120/220 receiving (e.g., at 421) a request for the live content, causing the in-vehicle device 120/220 to transmit (e.g., at 422) at least one of geo-location information, route information, or vehicle information to a cloud service 150/250. Also, for example, the method 700 comprises causing the SDN/SSD 130/230 to receive (e.g., at 423) the at least one of the geo-location information, the route information, or the vehicle information from the cloud service 150/250. Further, for example, the method 700 comprises causing the SDN/SSD 130/230 to transmit (e.g., at 424) to a drone 280 information preparing the drone 280 for transmitting the live content. In addition, for example, the method 700 comprises causing the drone 280 to navigate (e.g., at 425) to a location of the vehicle 290. Moreover, for example, the method 700 comprises causing the drone 280 to identify (e.g., at 426) the vehicle 290. Furthermore, for example, the method 700 comprises causing the drone 280 to transmit (e.g., at 427) the live content to the vehicle 290.

For example, the method 700 comprises based at least in part on the in-vehicle device 120/220 receiving (e.g., at 431) a request for the live content, transmitting (e.g., at 432), at the CDN 140/240, the request for transfer of the live content via a drone 280. Also, for example, the method 700 comprises based at least in part on the drone 280 receiving (e.g., at 432) the request from the CDN 140/240 for transfer of the live content via the drone 280, causing the drone 280 to navigate (e.g., at 433) to a location of the SDN/SSD 130/230.

For example, the method 700 comprises based at least in part on a drone 280 receiving (e.g., at 435) a request for transfer of the live content via the drone 280 from the vehicle 290, causing the drone 280 to transmit and/or receive (e.g., at 436) the live content to and/or from the SDN/SSD 130/230.

For example, the method 700 comprises causing a drone 280 to transmit and/or receive (e.g., at 437) the live content to and/or from the vehicle 290.

For example, the method 700 comprises causing a drone 280 to transmit and/or receive (e.g., at 439) the live content to and/or from a web service.

For example, the method 700 comprises transmitting (e.g., at 441), to a drone 280 and from the CDN 140/240, information to prepare the drone 280 for delivery of the live content via the SDN/SSD 130/230. Also, for example, the method 700 comprises transmitting (e.g., at 442) the live content from the CDN 140/240 to the drone 280. Further, for example, the method 700 comprises causing the drone 280 to transmit (e.g., at 443) the live content to the SDN/SSD 130/230. In addition, for example, the method 700 comprises causing the SDN/SSD 130/230 to receive (e.g., at 443) the live content from the drone 280.

For example, the method 700 comprises causing the drone 280 to deliver (e.g., at 445) the live content to the SDN/SSD 130/230 via one or more memory devices. Also, for example, the method 700 comprises causing the SDN/SSD 130/230 to receive (e.g., at 445) the live content from the drone 280 via the one or more memory devices.

For example, the method 700 comprises causing the drone 280 to navigate (e.g., at 447) to a location of the SDN/SSD 130/230. Also, for example, the method 700 comprises causing the drone 280 to transmit (e.g., at 447) the live content wirelessly to the SDN/SSD 130/230. Further, for example, the method 700 comprises causing the SDN/SSD 130/230 to receive (e.g., at 447) the live content wirelessly from the drone 280.

For example, the method 700 comprises causing to transmit (e.g., at 448) the live content from one node of the SDN/SSD 130/230 to another node of the SDN/SSD 130/230 utilizing a peer-to-peer protocol.

Although some examples herein relate to a passenger vehicle, additional applications are provided. For instance, the examples herein are also applied to trains, aircraft, ships, buses, emergency vehicles, recreational vehicles, bicycles, motorcycles, subways, trams, and other conveyances. Also, the examples herein are applied to other conveyances including freight trains, cargo ships, agricultural machinery, delivery trucks, delivery vans, drones, and the like. Further, the examples herein are applied to fixed systems like pipelines, power distribution systems, water supply systems, sewage systems, gas distribution systems, and the like.

Predictive Model

In some embodiments, one or more artificial intelligence (AI) models and/or tools are employed to provide the functionality disclosed herein. The one or more AI models and/or tools are provided for at least one of CDN streaming (e.g., at 310), enhanced VOD streaming (e.g., at 310), enhanced gaming services (e.g., at 310), data exchange for vehicles, prewarming SSDs (e.g., with VOD content) (e.g., at 320), switching from mobile to SSD streaming (e.g., at 330), uploading content via an SSD network (e.g., at 340), utilizing one or more efficient data transfer protocols (e.g., at 350), segmenting files (e.g., at 360), sequentially downloading (e.g., segmented) files (e.g., at 360), real-time geolocation (e.g., at 370), pre-authorization (e.g., at 370), data navigation (e.g., at 370), identification (e.g., via V2I communication) (e.g., at 370), utilizing a hybrid architecture (e.g., at 380), buffering files (e.g., at 380), broadcasting (e.g., buffered) files (e.g., at 380), drone-based content delivery (e.g., at 410), client geo-location (e.g., at 420), route data for drone navigation (e.g., at 420), drone-based content transfer to and/or from one or more vehicles (e.g., at 430), drone-based content transfer between one or more SSD networks (e.g., at 440), combinations of the same, or the like.

For example, AI systems are provided to process large amounts of data, recognize patterns, and make decisions based on the analyzed data. Also, for example, the AI systems are integrated into one or more CDNs and/or SDNs/SSDs for vehicles, enhancing media consumption experiences. Further, for example, AI methods comprise at least one of machine learning, deep learning, natural language processing, computer vision, combinations of the same, or the like. For instance, machine learning algorithms predict traffic patterns and/or optimize content delivery based on user preferences and network conditions. In addition, for example, models are trained by applying the AI methods to data. Moreover, for example, the trained models are configured to provide determinations, predictions, and likelihoods based on data inputs. Furthermore, for example, a trained model in the content delivery system predicts an optimal node of the SDN/SSD. Additionally, for example, the AI systems make determinations by analyzing data and identifying patterns. Still further, for example, the AI system determines an optimal content delivery method (e.g., CDN streaming, SSD streaming, or the like) based on current conditions. Even further, for example, the AI systems predict future events and/or behaviors based on historical data (e.g., predicting traffic conditions to optimize content delivery). Yet further, for example, the AI systems calculate the likelihood of various outcomes based on data. Further still, for example, the AI system calculates a likelihood of network congestion and pre-fetches content to local SSDs to ensure smooth playback.

For example, one or more predictive models are used to forecast outcomes based on input data. Also, for example, these models are trained using historical data and then applied to new data to make predictions. Further, for example, for content delivery, the predictive models are used to forecast content demand, optimize content caching strategies, or predict network performance.

By integrating AI systems, methods, and trained models, the content delivery system provides intelligent content delivery, real-time updates, and optimized performance.

Throughout the present disclosure, in some embodiments, determinations, predictions, likelihoods, and the like are determined with one or more predictive models. In some embodiments, the model receives various forms of data about users, infrastructure, vehicles, applications, media content items, devices, and more. This comprises usage data, load-balancing data, and metadata. The model performs analysis based on hard rules, learning rules, hard models, learning models, usage data, load data, analytics, metadata, profile information, or combinations of these. The model outputs predictions of a future state of any of the devices described. Load-increasing events are determined by load-balancing processes. The model is based on inputs including hard rules, user-defined rules, rules defined by content providers, hard models, learning models, or combinations of these. The model is trained with data using various data processes, analytical processes, and machine learning approaches. It comprises regression and classification analyses. An example of a multi-layer neural network is provided. The model is based on data engineering and modeling processes, and is operationalized using registration, deployment, monitoring, and retraining processes. The model is configured to output results to one or multiple devices, which can perform various functions. The devices can be a server, tablet, media display device, network-connected computer, media device, computing device, or combinations of these. The model outputs a current state, future state, determination, prediction, or likelihood. These outputs may be compared to a predetermined or determined standard. If the standard is satisfied or rejected, the predictive process outputs at least one of the current state, future state, determination, prediction, or likelihood to any device or module disclosed.

In some embodiments, the model ingests diverse forms of data about users, infrastructure, vehicles, applications, media content items, devices, and more. This encompasses user interaction data, load-distribution data, and metadata. The model conducts analysis based on deterministic rules, learned rules, deterministic models, learned models, user interaction data, load data, analytics, metadata, user profile information, or combinations thereof. The model generates predictions of a future state of any of the described devices. Load-increasing events are identified by load-distribution processes.

The model is constructed based on inputs including deterministic rules, user-defined rules, rules defined by content providers, deterministic models, learned models, or combinations thereof. The model is trained with data using various data processing methods, analytical processes, and machine learning techniques. It comprises regression and classification analyses. An example of a deep neural network is provided.

The model is built upon data engineering and modeling processes and is operationalized using registration, deployment, monitoring, and retraining processes. The model is designed to output results to one or multiple devices, which can perform various functions. The devices can be a server, tablet, digital display device, network-connected computer, media device, computing device, or combinations thereof.

The model outputs a current state, future state, determination, prediction, or probability. These outputs may be compared to a predetermined or determined benchmark. If the benchmark is met or not met, the predictive process outputs at least one of the current state, future state, determination, prediction, or probability to any device or module disclosed.

For example, FIG. 8 depicts a predictive model. A prediction process 800 comprises a predictive model 850 in some embodiments. The predictive model 850 receives as input various forms of data about one, more or all the users, infrastructure, vehicles, applications, media content items, devices, and data described in the present disclosure. The predictive model 850 performs analysis based on at least one of hard rules, learning rules, hard models, learning models, usage data, load data, analytics of the same, metadata, profile information, combinations of the same, or the like. The predictive model 850 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 850 is based on input including at least one of a hard rule 805, a user-defined rule 810, a rule defined by a content provider 815, a hard model 820, a learning model 825, combinations of the same, or the like.

The predictive model 850 receives as input usage data 830. The predictive model 850 is based, in some embodiments, on at least one of a usage pattern of the user or media device, a usage pattern of the requesting media device, a usage pattern of the media content item, a usage pattern of the communication system or network, a usage pattern of the profile, a usage pattern of the media device, combinations of the same, or the like.

The predictive model 850 receives as input load-balancing data 835. The predictive model 850 is based on at least one of load data of the display device, load data of the requesting media device, load data of the media content item, load data of the communication system or network, load data of the profile, load data of the media device, combinations of the same, or the like.

The predictive model 850 receives as input metadata 840. The predictive model 850 is based on at least one of metadata of the streaming service, metadata of the requesting media device, metadata of the media content item, metadata of the communication system or network, metadata of the profile, metadata of the media device, combinations of the same, or the like. The metadata comprises information of the type represented in the media device manifest.

The predictive model 850 is trained with data. The training data is developed in some embodiments using one or more data processes including but not limited to data selection, data sourcing, and data synthesis. The predictive model 850 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 850 is trained in some embodiments with one or more machine learning approaches including but not limited to supervised learning, unsupervised learning, semi-supervised learning, reinforcement learning, and dimensionality reduction. The predictive model 850 in some embodiments comprises regression analysis including analysis of variance (ANOVA), linear regression, logistic regression, ridge regression, and/or time series. The predictive model 850 in some embodiments comprises classification analysis including decision trees and/or neural networks. In FIG. 8, a depiction of a multi-layer neural network is provided as a non-limiting example of a predictive model

850, the neural network including an input layer (left side), three hidden layers (middle), and an output layer (right side) with 32 neurons and 192 edges, which is intended to be illustrative, not limiting. The predictive model 850 is based on data engineering and/or modeling processes. The data engineering processes include exploration, cleaning, normalizing, feature engineering, and scaling. The modeling processes include model selection, training, evaluation, and tuning. The predictive model 850 is operationalized using registration, deployment, monitoring, and/or retraining processes.

The predictive model 840 is configured to output results to a device or multiple devices. The device comprises means for performing one, more, or all the features referenced herein of the systems, methods, processes, and outputs of one or more of FIGS. 1-7, in any suitable combination. The device is at least one of a server 855, a tablet 860, a media display device 865, a network-connected computer 870, a media device 875, a computing device 880, combinations of the same, or the like.

The predictive model 850 is configured to output a current state 881, and/or a future state 883, and/or a determination, a prediction, or a likelihood 885, and the like. The current state 881, and/or the future state 883, and/or the determination, the prediction, or the likelihood 885, and the like may be compared 890 to a predetermined or determined standard. In some embodiments, the standard is satisfied (2190=OK) or rejected (2190=NOT OK). If the standard is satisfied or rejected, the predictive process 800 outputs at least one of the current state, the future state, the determination, the prediction, the likelihood to any device or module disclosed herein, combinations of the same, or the like. In some embodiments, the predictive model 850 incorporates one or more LLMs.

Communication System

A communication system is provided including a computing device, a server, and a communication network. Both the server and the communication network can exist in multiple forms and can connect directly or indirectly. The computing device comprises control circuitry, a display, and I/O circuitry. The control circuitry can execute systems, methods, processes, and outputs. Both the computing device and server include control circuitry and storage, which can store content, metadata, data, user profiles, messages, and commands for an application. The computing device communicates with an I/O device and can receive and process user inputs locally or transmit them to the remote server for processing. Both the server and the computing device can transmit and receive content via the communication network or directly, and the processing circuitry receives the user input and converts it to digital signals.

In some embodiments, the system is a distributed network with an edge device (a type of computing device 902), a cloud server (a type of server 904), and an internet of things (IoT) network (a type of communication network 906). Both the edge device and server have microservices and data lakes. The edge device comprises a user interface and I/O ports. User interactions can be processed at the edge or in the cloud. The system can transmit and receive digital assets via the IoT network. The edge device communicates with an IoT device and can be various types of smart devices capable of displaying and interacting with digital content. The communication paths in the system can be optimized for latency and bandwidth efficiency.

FIG. 9 depicts a block diagram of system 900, in accordance with some embodiments. The system is shown to include computing device 902, server 904, and a communication network 906. It is understood that while a single instance of a component may be shown and described relative to FIG. 9, additional embodiments of the component may be employed. For example, server 904 may include, or may be incorporated in, more than one server. Similarly, communication network 906 may include, or may be incorporated in, more than one communication network. Server 904 is shown communicatively coupled to computing device 902 through communication network 906. While not shown in FIG. 9, server 904 may be directly communicatively coupled to computing device 902, for example, in a system absent or bypassing communication network 906.

Communication network 906 may include one or more network systems, such as, without limitation, the internet, LAN, Wi-Fi, wireless, or other network systems suitable for audio processing applications. The system 900 of FIG. 9 excludes server 904, and functionality that would otherwise be implemented by server 904 is instead implemented by other components of the system depicted by FIG. 9, such as one or more components of communication network 906. In still other embodiments, server 904 works in conjunction with one or more components of communication network 906 to implement certain functionality described herein in a distributed or cooperative manner. Similarly, the system depicted by FIG. 9 excludes computing device 902, and functionality that would otherwise be implemented by computing device 902 is instead implemented by other components of the system depicted by FIG. 9, such as one or more components of communication network 906 or server 904 or a combination of the same. In other embodiments, computing device 902 works in conjunction with one or more components of communication network 906 or server 904 to implement certain functionality described herein in a distributed or cooperative manner.

Computing device 902 comprises control circuitry 908, display 910 and input/output (I/O) circuitry 912. Control circuitry 908 may be based on any suitable processing circuitry and comprises control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 908 in turn comprises communication circuitry 926, storage 922 and processing circuitry 918. Either of control circuitry 908 and 934 may be utilized to execute or perform any or all the systems, methods, processes, and outputs of one or more of FIGS. 1-8, or any combination of steps thereof (e.g., as enabled by processing circuitries 918 and 936, respectively).

In addition to control circuitry 908 and 934, computing device 902 and server 904 may each include storage (storage 922, and storage 938, respectively). Each of storages 922 and 938 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 922 and 938 may be used to store several types of content, metadata, and/or other types of data. Non-volatile memory may also be used (e.g., to launch a boot-up routine and other instructions). Cloud-based storage may be used to supplement storages 922 and 938 or instead of storages 922 and 938. In some embodiments, a user profile and messages corresponding to a chain of communication may be stored in one or more of storages 922 and 938. Each of storages 922 and 938 may be utilized to store commands, for example, such that when each of processing circuitries 918 and 936, respectively, are prompted through control circuitries 908 and 934, respectively. Either of processing circuitries 918 or 936 may execute any of the systems, methods, processes, and outputs of one or more of FIGS. 1-8, or any combination of steps thereof.

In some embodiments, control circuitry 908 and/or 934 executes instructions for an application stored in memory (e.g., storage 922 and/or storage 938). Specifically, control circuitry 908 and/or 934 may be instructed by the application to perform the functions discussed herein. In some embodiments, any action performed by control circuitry 908 and/or 934 may be based on instructions received from the application. For example, the application may be implemented as software or a set of and/or one or more executable instructions that may be stored in storage 922 and/or 938 and executed by control circuitry 908 and/or 934. The application may be a client/server application where only a client application resides on computing device 902, and a server application resides on server 904.

The application may be implemented using any suitable arrangement. For example, it may be a stand-alone application wholly implemented on computing device 902. In such an approach, instructions for the application are stored locally (e.g., in storage 922), and data for use by the application is downloaded on a periodic basis (e.g., from an out-of-band feed, from an internet resource, or using another suitable approach). Control circuitry 908 may retrieve instructions for the application from storage 922 and process the instructions to perform the functionality described herein. Based on the processed instructions, control circuitry 908 may determine a type of action to perform based at least in part on input received from I/O circuitry 912 or from communication network 906.

The computing device 902 is configured to communicate with an I/O device (not shown) via the I/O circuitry 912. In some embodiments, the user input 914 is received from the I/O device. A wired and/or wireless connection between the I/O circuitry 912 and the I/O device is provided in some embodiments. The I/O device may be, for example, at least one of a keyboard, a mouse, a touchscreen, a microphone, a scanner, a joystick, a graphics tablet, a monitor, a printer, speakers, headphones, a projector, a headset, a wearable device, a gaming controller, an external hard drive, a USB hard drive, an SD card, a network interface card (NIC), combinations of the same, or the like.

In client/server-based embodiments, control circuitry 908 may include communication circuitry suitable for communicating with an application server (e.g., server 904) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 906). In another example of a client/server-based application, control circuitry 908 runs a web browser that interprets web pages provided by a remote server (e.g., server 904). For example, the remote server may store the instructions for the application in a storage device.

The remote server may process the stored instructions using circuitry (e.g., control circuitry 934) and/or generate displays. Computing device 902 may receive the displays generated by the remote server and may display the content of the displays locally via display 910. For example, display 910 may be utilized to present a string of characters. This way, the processing of the instructions is performed remotely (e.g., by server 904) while the resulting displays, such as the display windows described elsewhere herein, are provided locally on computing device 904. Computing device 902 may receive inputs from the user via input/output circuitry 912 and transmit those inputs to the remote server for processing and generating the corresponding displays.

Alternatively, computing device 902 may receive inputs from the user via input/output circuitry 912 and process and display the received inputs locally, by control circuitry 908 and display 910, respectively. For example, input/output circuitry 912 may correspond to a keyboard and/or a set of and/or one or more speakers/microphones which are used to receive user inputs (e.g., input as displayed in a search bar or a display of FIG. 9 on a computing device). Input/output circuitry 912 may also correspond to a communication link between display 910 and control circuitry 908 such that display 910 updates based at least in part on inputs received via input/output circuitry 912 (e.g., simultaneously update what is shown in display 910 based on inputs received by generating corresponding outputs based on instructions stored in memory via a non-transitory, computer-readable medium).

Server 904 and computing device 902 may transmit and receive content and data such as media content via communication network 906. For example, server 904 may be a media content provider, and computing device 902 may be a smart television configured to download or stream media content, such as a live news broadcast, from server 904. Control circuitry 934, 908 may send and receive commands, requests, and other suitable data through communication network 906 using communication circuitry 932, 926, respectively. Alternatively, control circuitry 934, 908 may communicate directly with each other using communication circuitry 932, 926, respectively, avoiding communication network 906.

It is understood that computing device 902 is not limited to the embodiments and methods shown and described herein. In nonlimiting examples, computing device 902 may be a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 902 receives user input 914 at input/output circuitry 912. For example, computing device 902 may receive a user input such as a user swipe or user touch. It is understood that computing device 902 is not limited to the embodiments and methods shown and described herein.

User input 914 may be received from a user selection-capturing interface that is separate from device 902, such as a remote-control device, trackpad, or any other suitable user movement-sensitive, audio-sensitive or capture devices, or as part of device 902, such as a touchscreen of display 910. Transmission of user input 914 to computing device 902 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, NearLink, ultra-wideband technology, or any other suitable wireless transmission protocol. Input/output circuitry 912 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 918 may receive user input 914 from input/output circuitry 912 using communication path 916. Processing circuitry 918 may convert or translate the received user input 914 that may be in the form of audio data, visual data, gestures, or movement to digital signals. In some embodiments, input/output circuitry 912 performs the translation to digital signals. In some embodiments, processing circuitry 918 (or processing circuitry 936, as the case may be) conducts disclosed processes and methods.

Processing circuitry 918 may provide requests to storage 922 by communication path 920. Storage 922 may provide requested information to processing circuitry 918 by communication path 946. Storage 922 may transfer a request for information to communication circuitry 926 which may translate or encode the request for information to a format receivable by communication network 906 before transferring the request for information by communication path 928. Communication network 906 may forward the translated or encoded request for information to communication circuitry 932, by communication path 930.

At communication circuitry 932, the translated or encoded request for information, received through communication path 930, is translated or decoded for processing circuitry 936, which will provide a response to the request for information based on information available through control circuitry 934 or storage 938, or a combination thereof. The response to the request for information is then provided back to communication network 906 by communication path 940 in an encoded or translated format such that communication network 906 forwards the encoded or translated response back to communication circuitry 926 by communication path 942.

At communication circuitry 926, the encoded or translated response to the request for information may be provided directly back to processing circuitry 918 by communication path 954 or may be provided to storage 922 through communication path 944, which then provides the information to processing circuitry 918 by communication path 946. Processing circuitry 918 may also provide a request for information directly to communication circuitry 926 through communication path 952, where storage 922 responds to an information request (provided through communication path 920 or 944) by communication path 924 or 946 that storage 922 does not contain information pertaining to the request from processing circuitry 918.

Processing circuitry 918 may process the response to the request received through communication paths 946 or 954 and may provide instructions to display 910 for a notification to be provided to the users through communication path 948. Display 910 may incorporate a timer for providing the notification or may rely on inputs through input/output circuitry 912 from the user, which are forwarded through processing circuitry 918 through communication path 948, to determine how long or in what format to provide the notification. When display 910 determines the display has been completed, a notification may be provided to processing circuitry 918 through communication path 950.

The communication paths provided in FIG. 9 between computing device 902, server 904, communication network 906, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that comprises a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media comprises any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flow-charts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for content delivery and data exchange in a vehicle utilizing a storage device network (SDN) and a content delivery network (CDN), wherein the SDN comprises a plurality of nodes, the method performed by an in-vehicle device, the method comprising:

causing streaming of content from the CDN to the vehicle by:

causing to access a location of the vehicle along a vehicle path;

causing to access information regarding content availability from the CDN;

based at least in part on the location of the vehicle along the vehicle path, and the content availability from the CDN:

causing to determine an optimal node of the plurality of nodes of the SDN along the vehicle path for delivery of the content; and based at least in part on the determining the optimal node of the SDN along the vehicle path for the delivery of the content:

causing to process the content at the optimal node of the SDN along the vehicle path; and causing to switch from streaming the content via the CDN to streaming the content via the optimal node of the SDN along the vehicle path.

2. The method of claim 1, comprising:

receiving a request for content;

based on the request, transmitting a request for content to the CDN, which causes the CDN to receive and archive the content in real time at the SDN; and receiving one or more content segments of the content from the SDN.

3. The method of claim 1, wherein the content is video-on-demand content, and wherein the causing to process the content at the optimal node of the SDN along the vehicle path comprises:

receiving a request for content;

based on the request, transmitting at least one of geo-location information, route data, or client data to a cloud service, which causes:

the cloud service to analyze the at least one of the geo-location information, the route data, or the client data;

based on the analyzing the at least one of the geo-location information, the route data, or the client data:

transmitting the content from the CDN to the SDN; and processing the content at the SDN; and receiving the processed content from the SDN.

4. The method of claim 1, wherein the content is live content, and wherein the causing to switch from streaming the content via the CDN to streaming the content via the SDN along the vehicle path comprises:

receiving a request for content via a mobile network;

based on the request, transmitting a request to stream the content to the CDN;

receiving the stream of the content from the CDN;

based on detecting the optimal node of the SDN near the vehicle:

switching to streaming from the optimal node of the SDN; and receiving the content from the optimal node of the SDN.

5. The method of claim 1, comprising:

receiving user selection of a trick-play option at the in-vehicle device; and in response to the receiving the user selection of the trick-play option at the in-vehicle device, performing the trick-play option.

6. The method of claim 1, comprising the in-vehicle device uploading additional content to the SDN by:

receiving a user upload request;

based on the user upload request, connecting to the SDN;

uploading a content segment of additional content to the SDN, which causes the SDN to provide the uploaded content segment to the CDN; and receiving a confirmation of completion of the uploading from the SDN.

7. The method of claim 1, comprising transmitting and receiving the content via one or more transfer protocols by:

receiving a request for data transfer;

based on the request, connecting to the CDN and transferring data to the CDN, which causes the CDN to distribute data using the one or more transfer protocols to the SDN, wherein the one or more transfer protocols comprise at least one of IBM Aspera, Fast and Secure Protocol (FASP), Secure File Transfer Protocol (SFTP), or Secure Copy Protocol (SCP); and receiving the data from the SDN using one or more networking technologies including at least one of Wi-Fi Sixth Generation (Wi-Fi 6), Hypertext Transfer Protocol Version 2 (HTTP/2), Quick User Datagram Protocol (UDP) Internet Connections (QUIC), or Web Real-Time Communication (WebRTC).

8. The method of claim 1, comprising segmenting the content into files and sequentially downloading the segmented files by:

receiving a request for a file having a size greater than a predetermined threshold;

based on the request, requesting sequential download of a plurality of file segments from the SDN, wherein the file comprises the plurality of file segments;

requesting each of the plurality of file segments from the SDN; and receiving each of the plurality of file segments from the SDN until the file is complete.

9. The method of claim 1, comprising accessing one or more real-time geo-location, pre-authorization, data navigation, and identification services via vehicle-to-infrastructure (V2I) communication by:

receiving a request for a content delivery service;

based on the request, transmitting at least one of geo-location information, route data, or client data to a cloud service, which causes:

transferring, from the cloud service, the at least one of geo-location information, route data, or client data to a nearest node of the SDN;

authorizing, at the SDN, V2I communication with a V2I communication system;

receiving, at the SDN, vehicle identification data from the V2I communication system;

identifying, at the SDN, the vehicle via the V2I communication system; and verifying the vehicle at the SDN; and initiating data transfer from the SDN.

10. The method of claim 1, comprising buffering and/or providing a manifest file by:

receiving a request for content;

based on the request, requesting the content from the CDN, which causes the CDN to publish the content to the SDN;

receiving the manifest file with one or more SDN locations from the CDN, which causes the in-vehicle device to request the content from the SDN; and buffering a portion of the content having a size greater than a predetermined threshold.

11. A system for content delivery and data exchange in a vehicle utilizing a storage device network (SDN) and a content delivery network (CDN), the system comprising:

an in-vehicle device configured to:

access a location of the vehicle along a vehicle path;

access information regarding content availability from the CDN;

determine an optimal node of the SDN along the vehicle path for delivery of the content based at least in part on the location of the vehicle and the content availability;

process the content at the optimal node of the SDN; and switch from streaming the content via the CDN to streaming the content via the optimal node of the SDN.

12. The system of claim 11, wherein the in-vehicle device is configured to:

receive a request for content;

transmit a request for content to the CDN based on the request, causing the CDN to archive the content in real time at the SDN; and receive one or more content segments from the SDN.

13. The system of claim 11, wherein the content is video-on-demand content, and the in-vehicle device is configured to:

transmit at least one of geo-location information, route data, or client data to a cloud service based on a request, causing the cloud service to analyze the data and transmit the content from the CDN to the SDN;

process the content at the SDN; and receive the processed content from the SDN.

14. The system of claim 11, wherein the content is live content, and the in-vehicle device is configured to:

transmit a request to stream the content to the CDN based on a request;

receive the stream of the content from the CDN;

switch to streaming from the optimal node of the SDN based on detecting the optimal node near the vehicle; and receive the content from the optimal node of the SDN.

15. The system of claim 11, wherein the in-vehicle device is configured to:

receive user selection of a trick-play option; and perform the trick-play option in response to the user selection.

16. The system of claim 11, wherein the in-vehicle device is configured to upload additional content to the SDN by:

receiving a user upload request;

connecting to the SDN based on the user upload request;

uploading a content segment to the SDN, causing the SDN to provide the content segment to the CDN; and receiving a confirmation of completion of the upload from the SDN.

17. The system of claim 11, wherein the in-vehicle device is configured to transmit and receive content via one or more transfer protocols by:

connecting to the CDN and transferring data to the CDN based on a request, causing the CDN to distribute data using the transfer protocols to the SDN; and receiving the data from the SDN using networking technologies including at least one of Wi-Fi 6, HTTP/2, QUIC, or WebRTC.

18. The system of claim 11, wherein the in-vehicle device is configured to segment the content into files and sequentially download the segmented files by:

requesting sequential download of file segments from the SDN based on a request for a file larger than a predetermined threshold; and requesting and receiving each file segment from the SDN until the file is complete.

19. The system of claim 11, wherein the in-vehicle device is configured to access real-time geo-location, pre-authorization, data navigation, and identification services via vehicle-to-infrastructure (V2I) communication by:

transmitting geo-location information, route data, or client data to a cloud service based on a request, causing the cloud service to transfer the data to a nearest SDN node;

authorizing V2I communication with a V2I communication system at the SDN;

receiving vehicle identification data from the V2I communication system at the SDN;

identifying and verifying the vehicle at the SDN; and initiating data transfer from the SDN.

20. The system of claim 11, wherein the in-vehicle device is configured to buffer content and provide a manifest file by:

requesting content from the CDN based on a request, causing the CDN to publish the content to the SDN;

receiving the manifest file with SDN locations from the CDN, causing the in-vehicle device to request the content from the SDN; and buffering a portion of the content larger than a predetermined threshold.

* * * * *